(12) United States Patent
Fisher et al.

(10) Patent No.: US 9,340,302 B2
(45) Date of Patent: *May 17, 2016

(54) AIRCRAFT GROUNDING SYSTEM

(71) Applicant: AeroVironment, Inc., Monrovia, CA (US)

(72) Inventors: Christopher E. Fisher, Simi Valley, CA (US); John Peter Zwaan, Simi Valley, CA (US); David R. Thompson, Simi Valley, CA (US); Marc L. Schmalzel, Simi Valley, CA (US); Karl R. Klingbiel, Simi Valley, CA (US); Tyson R. Jensen, Simi Valley, CA (US); Pavel Belik, Simi Valley, CA (US); Eric James Aagaard, Los Angeles, CA (US)

(73) Assignee: AeroVironment, Inc., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,730

(22) Filed: Jan. 7, 2014

(65) Prior Publication Data

US 2014/0291443 A1     Oct. 2, 2014

Related U.S. Application Data

(63) Continuation of application No. 13/478,560, filed on May 23, 2012, now Pat. No. 8,622,343, which is a continuation of application No. PCT/US2010/057984, filed on Nov. 24, 2010.

(60) Provisional application No. 61/264,220, filed on Nov. 24, 2009.

(51) Int. Cl.
| | |
|---|---|
| *B64F 1/00* | (2006.01) |
| *B64F 1/12* | (2006.01) |
| *B64F 1/16* | (2006.01) |

(52) U.S. Cl.
CPC ... *B64F 1/12* (2013.01); *B64F 1/16* (2013.01); *Y10T 156/10* (2015.01); *Y10T 156/1788* (2015.01)

(58) Field of Classification Search
CPC .................................... B64F 1/12; B64F 1/16
USPC ................................ 156/71, 574; 244/110 R
See application file for complete search history.

(56) References Cited

U.S. PATENT DOCUMENTS

| | | |
|---|---|---|
| 964,186 A | 7/1910 | Weaver |
| 3,502,286 A | 3/1970 | Warren |

(Continued)

OTHER PUBLICATIONS

International Search Report for Serial No. PCT/US2010/057984 mailed Jan. 31, 2011.

(Continued)

*Primary Examiner* — Carson Gross
(74) *Attorney, Agent, or Firm* — Brooks Acordia IP Law, P.C.; Eric Aagaard

(57) ABSTRACT

Liquid dispensing assemblies including adhesive anchoring assemblies configured to adhere to a support surface external to a device such as a vehicle. An air vehicle includes (a) a fluid adhesive container assembly detachably attached to the air vehicle, wherein the fluid adhesive container assembly comprises: (i) an adhesive container comprising fluid adhesive; and (ii) one or more fibers, wherein the one or more fibers are configured, or a brush of fibers, or a fabric of fibers, is configured to conduct the fluid adhesive and to structurally support an adhesive bond between the one or more fibers and a surface; and (b) means for dispensing the fluid adhesive from the fluid adhesive container, to the one or more fibers.

31 Claims, 24 Drawing Sheets

(56) References Cited

U.S. PATENT DOCUMENTS

| | | | |
|---|---|---|---|
| 5,171,095 A | 12/1992 | Davies et al. | |
| 5,934,822 A | 8/1999 | Green | |
| 6,244,539 B1 | 6/2001 | Liston et al. | |
| 6,964,186 B1 | 11/2005 | Strasser et al. | |
| 7,337,638 B1 | 3/2008 | Tierney | |
| 7,371,303 B2 | 5/2008 | Schmitt | |
| 7,673,831 B2 * | 3/2010 | Steele et al. | 244/1 TD |
| 8,622,343 B2 * | 1/2014 | Fisher et al. | 244/110 R |
| 2003/0098399 A1 * | 5/2003 | Rodriguez | 248/176.1 |
| 2007/0051718 A1 | 3/2007 | Schmitt | |
| 2007/0164047 A1 | 7/2007 | Reidt et al. | |
| 2009/0103968 A1 | 4/2009 | Ballot | |
| 2010/0123047 A1 * | 5/2010 | Williams | 244/35 R |

OTHER PUBLICATIONS

Non-Final Office action for U.S. Appl. No. 13/478,560 mailed Feb. 28, 2013.
Restriction Requirement for U.S. Appl. No. 13/478,560 mailed Jan. 3, 2013.
Notice of Allowance for U.S. Appl. No. 13/478,560 mailed Aug. 29, 2013.
Supplmental EP Search report for EP Application No. 10 83 3910.2 mailed Dec. 9, 2013.

* cited by examiner

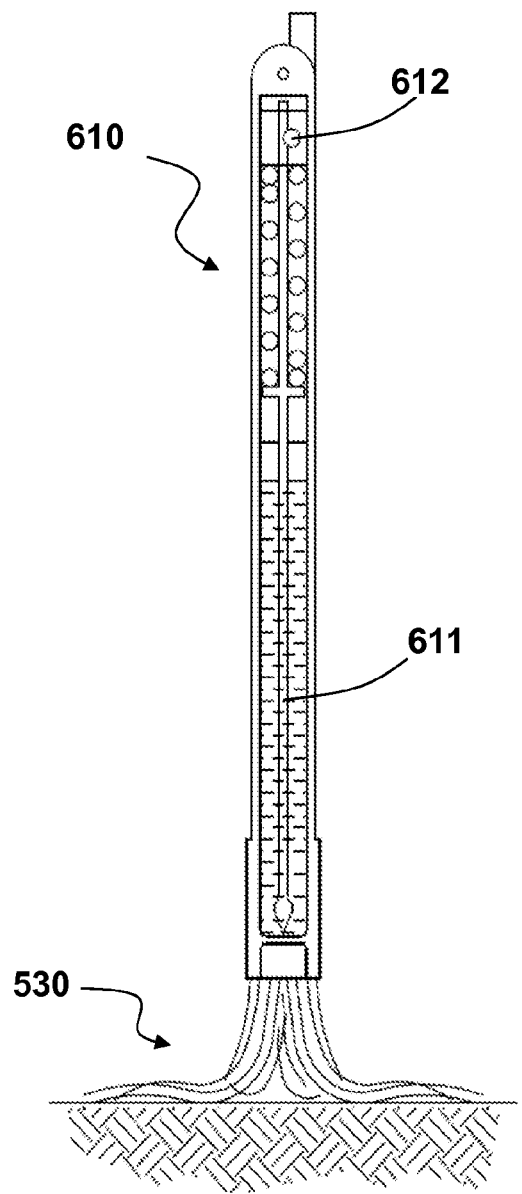
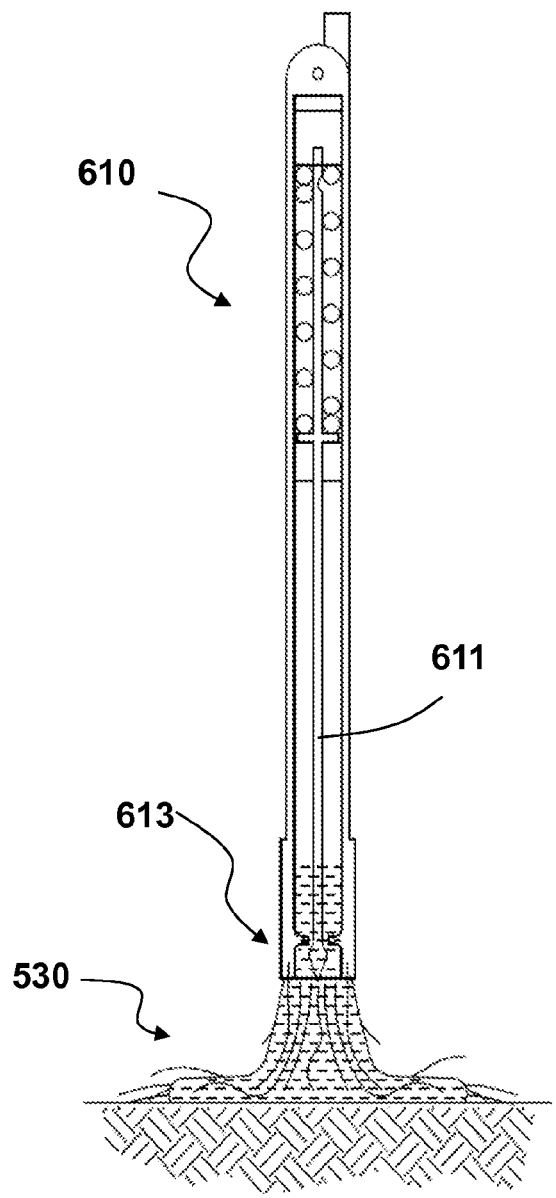
FIG. 6A
FIG. 6B

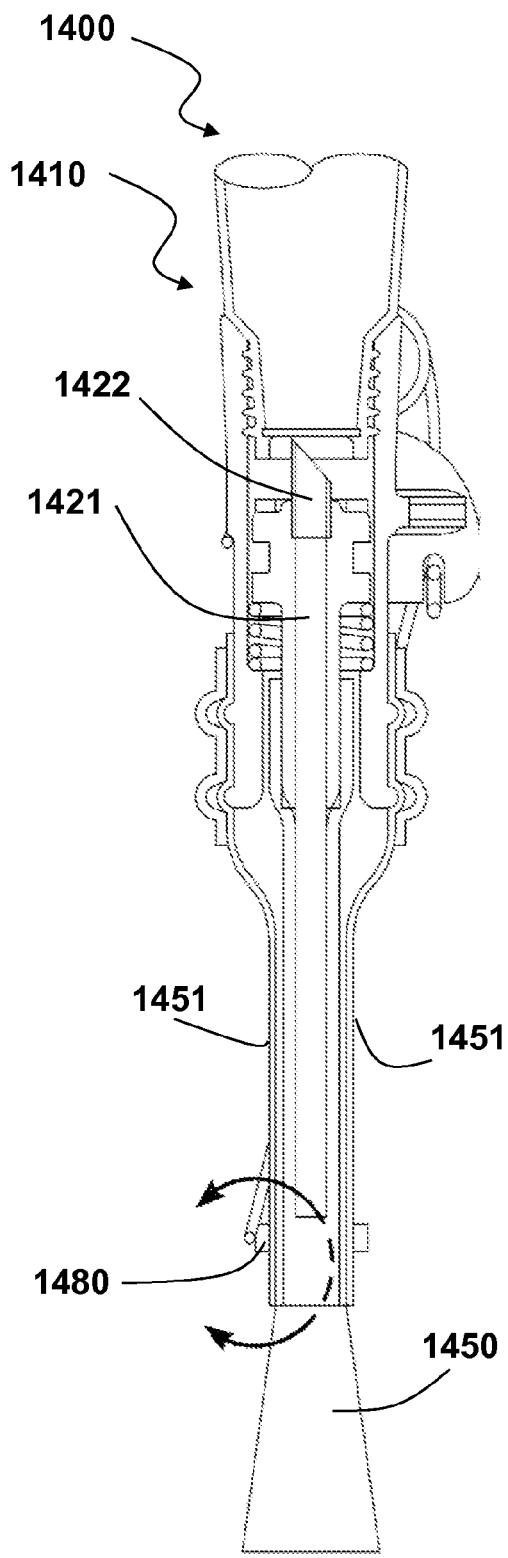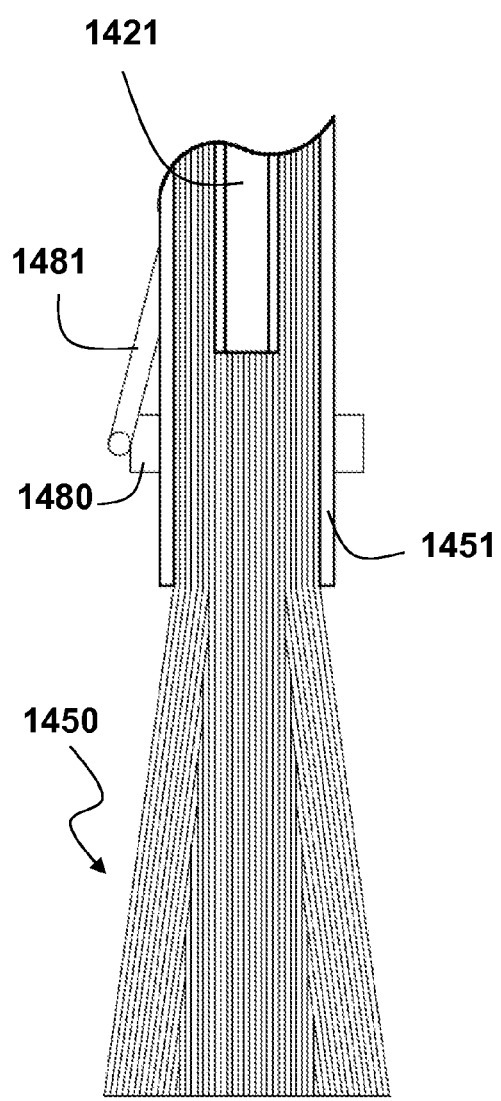
FIG. 14A
FIG. 14B

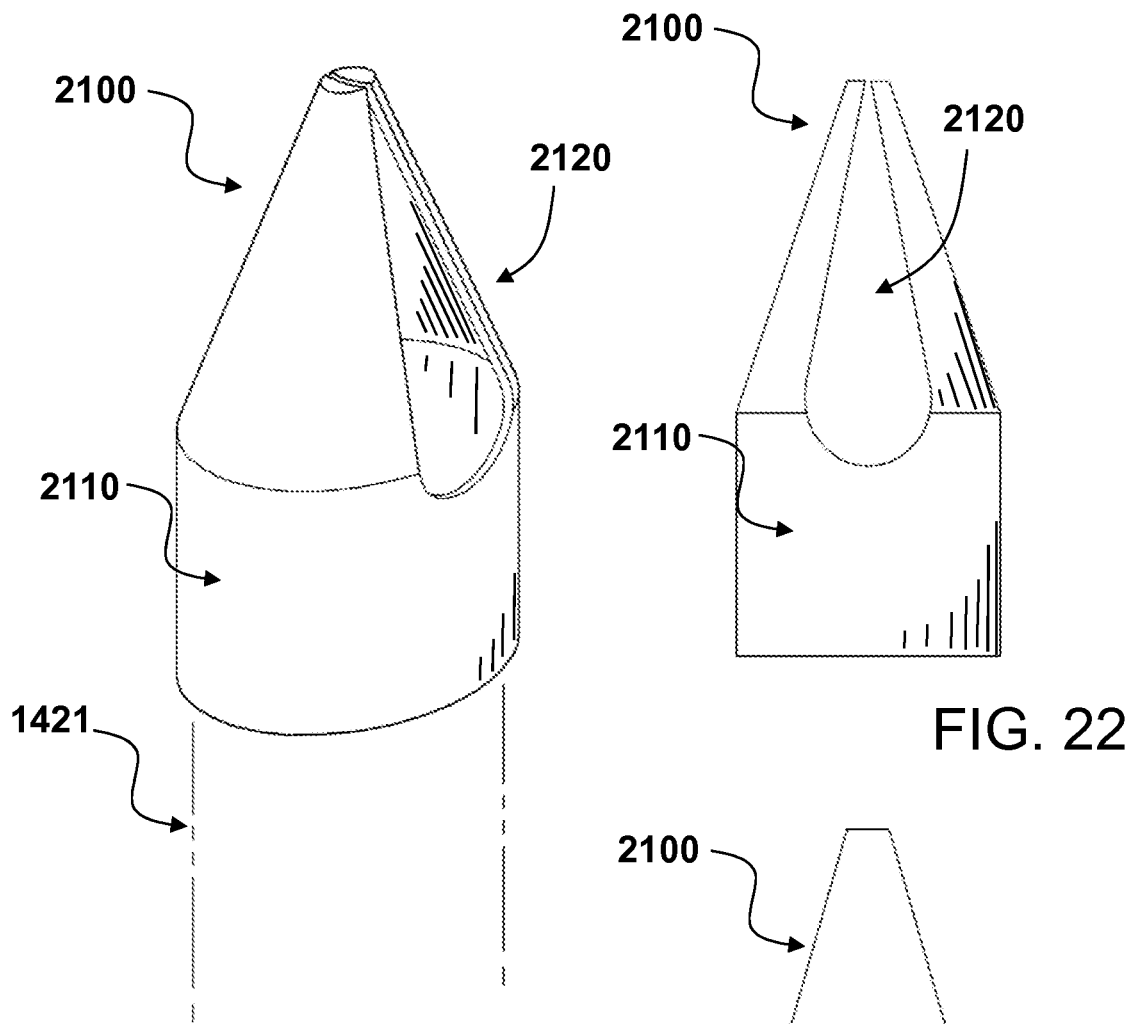
FIG. 21
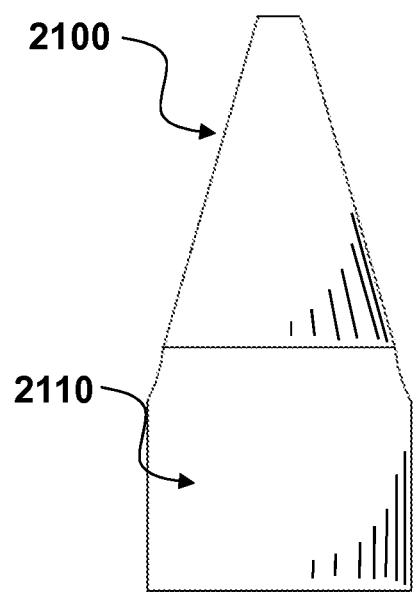
FIG. 22
FIG. 23
FIG. 24

AIRCRAFT GROUNDING SYSTEM

CROSS-REFERENCE TO RELATED APPLICATIONS

This application is a continuation U.S. patent application Ser. No. 13/478,560 filed May 23, 2012, which is a continuation of International Application No. PCT/US2010/057984, filed Nov. 24, 2010, and claims priority to and the benefit of U.S. Provisional Patent Application Ser. No. 61/264,220, filed Nov. 24, 2009, all of which are hereby incorporated herein by reference in their entirety for all purposes.

FEDERALLY SPONSORED RESEARCH

The invention was made with Government support under HR0011-07-C-0075 awarded by DARPA. The Government has certain rights in the invention.

TECHNICAL FIELD

Embodiments pertain to deployable adhesive anchoring systems and particularly to adhesive anchoring systems for aircraft.

BACKGROUND

An unmanned aerial vehicle (UAV) may land or alight on a surface on which the UAV may slide due to gravity or other forces such as aerodynamic forces. A UAV may land or alight on, or position itself proximate to, a surface on which the UAV may be tasked to apply a liquid-based pigment to a target region of the surface. The use of beacons, antenna elements, and/or instrumentation packets may require rapid affixing of such devices to surfaces or available support structures.

SUMMARY

Embodiments include liquid dispensing assemblies including adhesive anchoring assemblies configured to adhere to a support surface external to a vehicle. For example, an assembly may comprise: (a) an assembly housing comprising a fluid reservoir; (b) a resilient member disposed proximate to the assembly housing; and (c) a fluid conduit configured to pierce the reservoir responsive to a decompression of the resilient member. In some embodiments, the fluid may be an adhesive. In some embodiments, the assembly further comprises a liquid infusible brush. In still other embodiments, the fluid reservoir may be a liquid adhesive reservoir and the liquid infusible brush may be a liquid adhesive infusible brush. The fluid conduit may be configured to pierce the reservoir via a frusto-conical tip.

Embodiments may include a system comprising a vehicle and an adhesive anchoring assembly configured to adhere to a support surface external to the vehicle. For example, a portion of the adhesive anchoring assembly may be detachable. A portion of the adhesive anchoring assembly may be configured to rotate into a deployed position. The adhesive anchoring assembly may comprise a liquid adhesive reservoir and a liquid adhesive infusible brush.

Embodiments may include methods of attachment and detachable attachment. For example, a method of adhesive bonding may comprise: (a) providing an adhesive in a positive pressure reservoir having positive pressure above local atmospheric pressure to force a portion of the adhesive along a conduit to an application surface under local atmospheric pressure; and (b) releasing a resiliently loaded conduit having a tip configured to pierce the reservoir when the resiliently loaded conduit is unloaded. The exemplary reservoir may be detachably attached to a support structure, e.g., an air vehicle fuselage, and the method may further comprise detaching the reservoir from the support structure. Another exemplary method of detachably anchoring a device via adhesive bonding may comprise: (a) detachably attaching a positive pressure reservoir to a device, e.g., an air vehicle, an transmitter, or an illuminator, wherein the positive pressure reservoir contains an adhesive, and wherein the reservoir containing the adhesive has positive pressure above local atmosphere to force a portion of the adhesive along a conduit to an application surface under local atmospheric pressure; (b) releasing a resiliently loaded conduit having a tip configured to pierce the reservoir when the resiliently loaded conduit is unloaded; and (c) deploying the application surface to a surface of a support structure, e.g., a target anchoring surface. The exemplary reservoir may be fixedly attached to the support structure via the application surface connected to the conduit, itself connected to the detachable reservoir, and the method may further comprise detaching the reservoir from the device.

BRIEF DESCRIPTION OF THE DRAWINGS

Embodiments are illustrated by way of example and not limitation in the figures of the accompanying drawings, and in which:

FIGS. 6A and 6B illustrate another assembly embodiment of the present invention;

FIG. 14A illustrates in a cross-sectional view another embodiment of the present invention;

FIG. 14B illustrates in a cross-sectional view a portion of the embodiment of FIG. 14A;

FIG. 21 illustrates in a perspective view an exemplary frusto-conical tip of an embodiment of the present invention;

FIG. 22 illustrates in an elevational side view an exemplary frusto-conical tip of an embodiment of the present invention;

FIG. 23 illustrates in a top view an exemplary frusto-conical tip of an embodiment of the present invention;

FIG. 24 illustrates in an elevational front view an exemplary frusto-conical tip of an embodiment of the present invention;

DETAILED DESCRIPTION

Figure 1A:
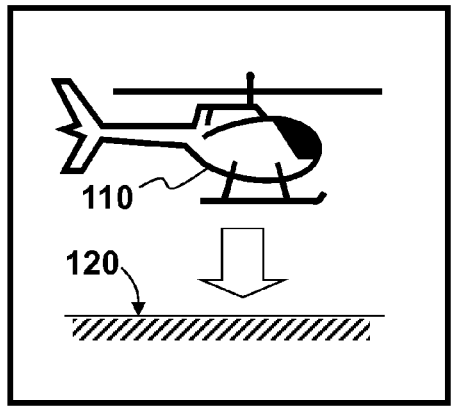
FIGS. 1A, 1B, and 1C illustrate an exemplary Vertical Take-Off and Landing (VTOL) use of an embodiment of the present invention.
Figure 1B:
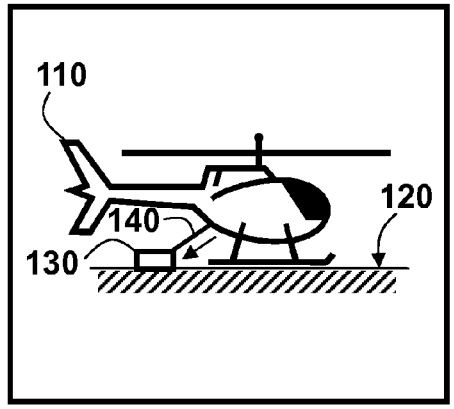
Figure 1C:
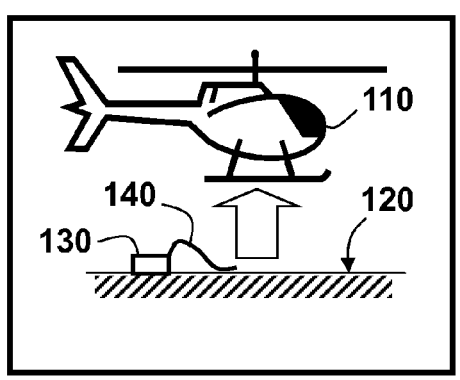
Figure 2A:
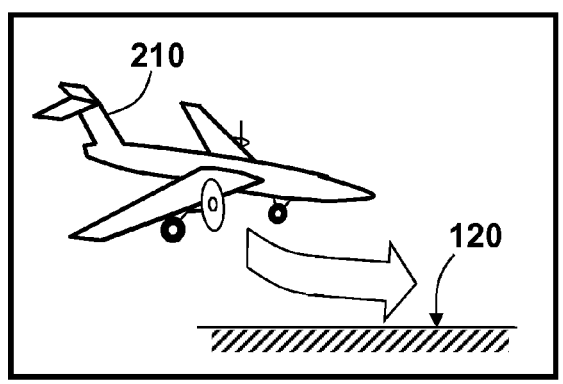
FIGS. 2A, 2B, and 2C illustrate an exemplary fixed-wing use of an embodiment of the present invention.
Figure 2B:
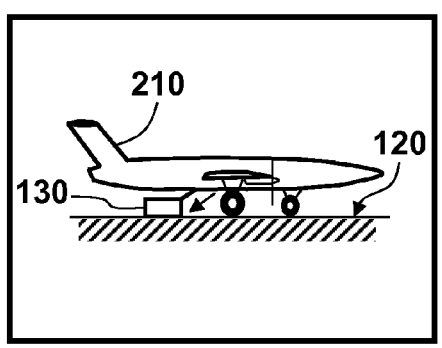
Figure 2C:
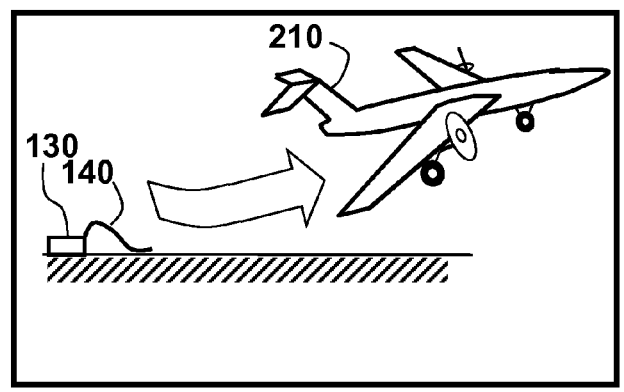

Reference is made to the drawings that illustrate exemplary embodiments of the present invention. FIGS. 1A, 1B, and 1C illustrate an exemplary embodiment of the present invention where, in FIG. 1A, a vertical takeoff and landing craft (VTOL) aircraft 110 such as a helicopter descends to a landing surface 120. A contact member 130 is extended in FIG. 1B from the aircraft 110 until the contact member makes contact with a portion of the landing surface 120. The contact member 130, either before or after making contact with the portion of the landing surface 120, may be infused or otherwise provided with an adhesive liquid causing the contact member 130 to bond with the portion of the landing surface 120. An attachment member 140 connects the contact member 130 to the aircraft 110. Accordingly, the aircraft 110 may be adhesively anchored to the landing surface 120. The attachment member 140 may detachably attach to either the aircraft 110, the contact member 130, or both. In particular, the attachment member 140 may detach from the aircraft 110 or the contact member 130, and the aircraft 110, being no longer anchored to the landing surface 120, may resume flight as shown in FIG. 1C. Similarly, FIGS. 2A, 2B, and 2C illustrate an exemplary embodiment of the present invention where, in FIG. 2A, a fixed wing aircraft 210 descends to a landing surface 120. In FIG. 2B a contact member 130 is extended from the aircraft and contacts a portion of the landing surface 120. The contact member 130 may be detachably attached from the aircraft 210 and the detached aircraft 210 may free to resume flight as shown in FIG. 2C.

Figures 3A, 3B:
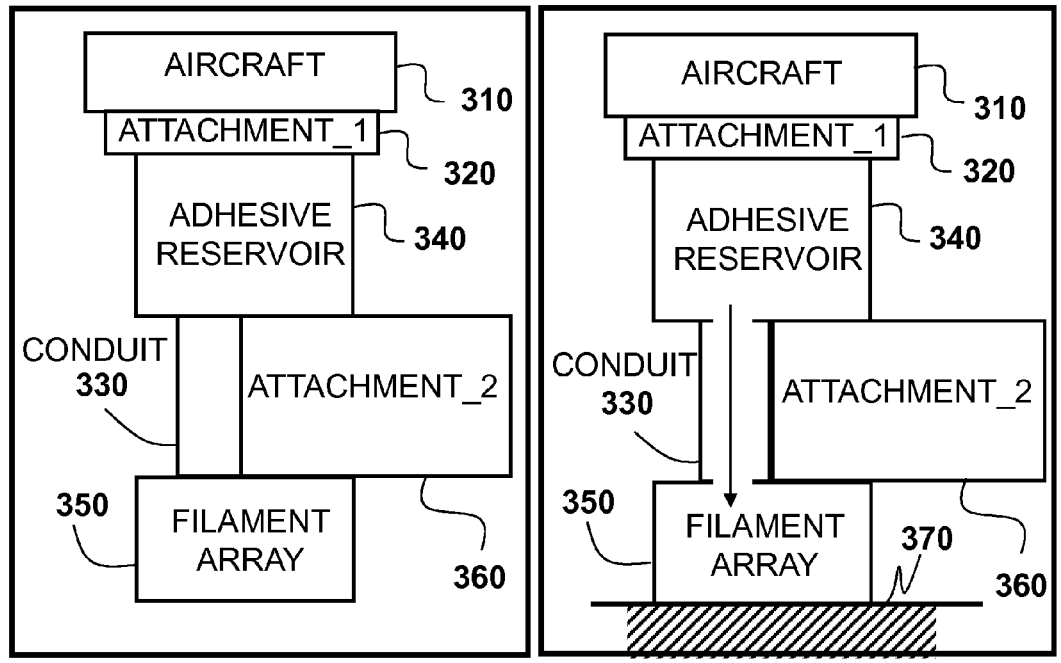
FIGS. 3A and 3B illustrate an exemplary arrangement of elements of an assembly embodiment of the present invention.
Figures 3C, 3D:
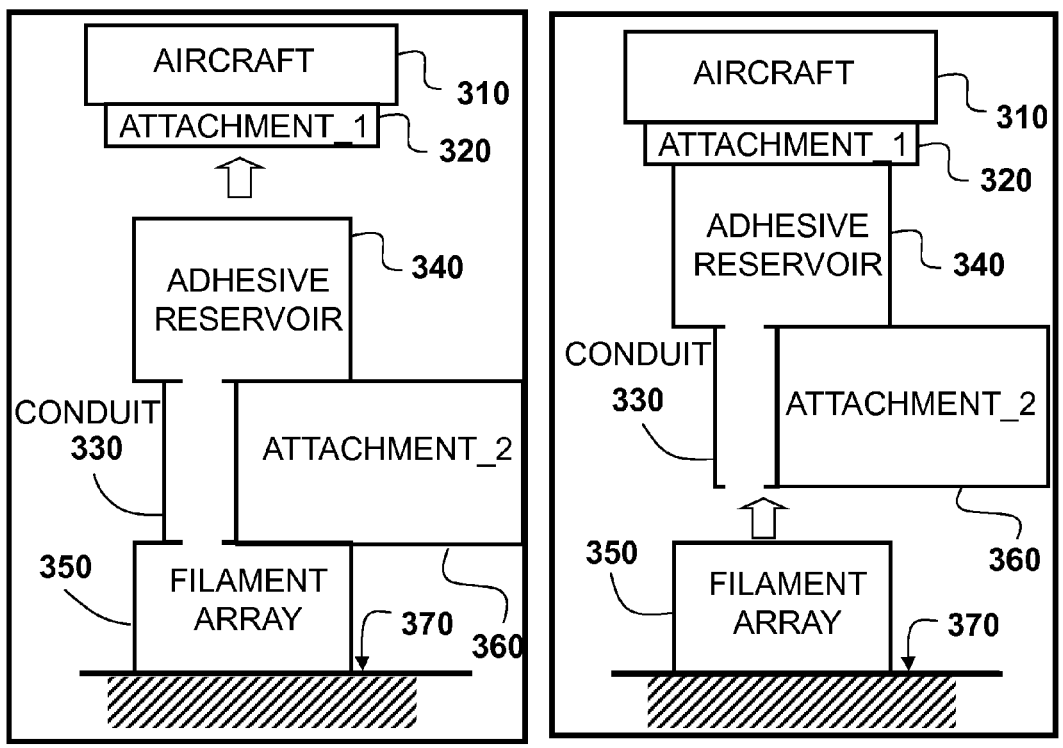
FIGS. 3C and 3D illustrate exemplary detachments of portions of the elements of assembly embodiments of the present invention.

FIG. 3A shows an assembly comprising an aircraft 310 attached to a liquid adhesive reservoir by an attachment_1 320. A channel or conduit 330 may be provided between the liquid adhesive reservoir 340 and a brush assembly 350 such as a filament array, bristle array, or an array of bundles, strips of fabric, cotton balls, or clumps of cloth. The liquid adhesive reservoir 340 may be attached by attachment_2 360 to the filament array 350. Before or after the filament array 350 contacts the anchoring surface 370, the liquid adhesive may flow from the liquid adhesive reservoir 340 to the filament array 350 via the conduit 330 as shown in FIG. 3B. The filament elements of the filament array 350 having liquid adhesive provide the anchoring surface 370 with bonding areas. Once elements of the filament array 350 have bonded to the anchoring surface 370, the aircraft may be adhesively anchored to the anchoring surface 370. To free itself from the anchor provided by the bonded elements of the filament array 350, the aircraft may be detached via release of attachment_1 320 as shown in FIG. 3C or release of attachment_2 360 as shown in FIG. 3D, or combinations thereof.

Figure 4:
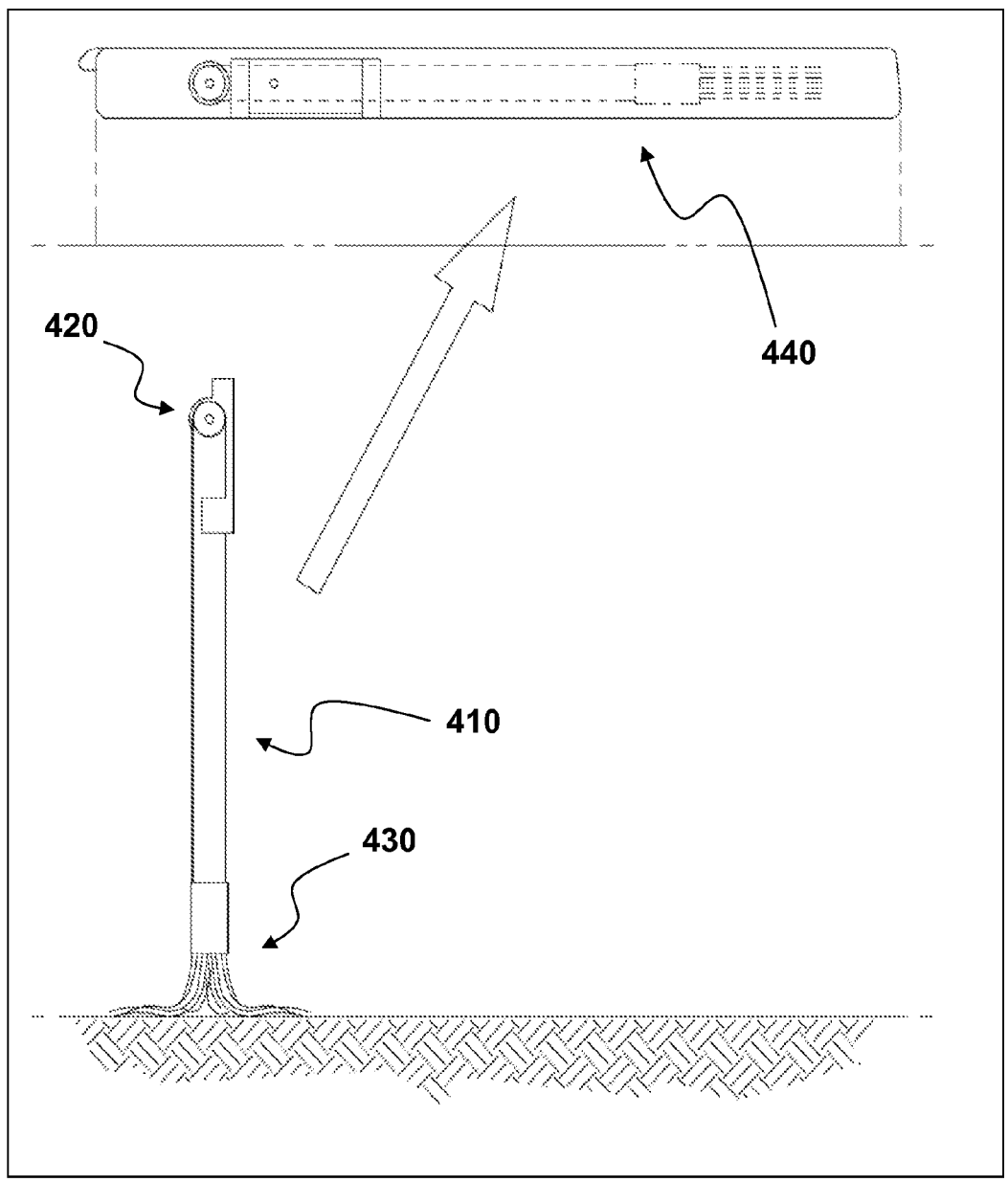
FIG. 4 illustrates an assembly embodiment of the present invention.

FIG. 4 shows an assembly comprising a cylinder 410 for containing a liquid adhesive reservoir where the assembly further comprises an attachment joint 420 at a proximal end of the cylinder and an array of filaments 430, bristles, or fabric strips, at the distal end of the cylinder. A channel or conduit may be provided within the cylinder 410 between the liquid adhesive reservoir and the filament array 430 for conducting the flow of the liquid adhesive to the filament array, where the filament array may be in contact with a surface for anchoring. FIG. 4 also shows the assembly may be stowed, prior to deployment, in a dispensing case 440.

Figures 5A, 5B:
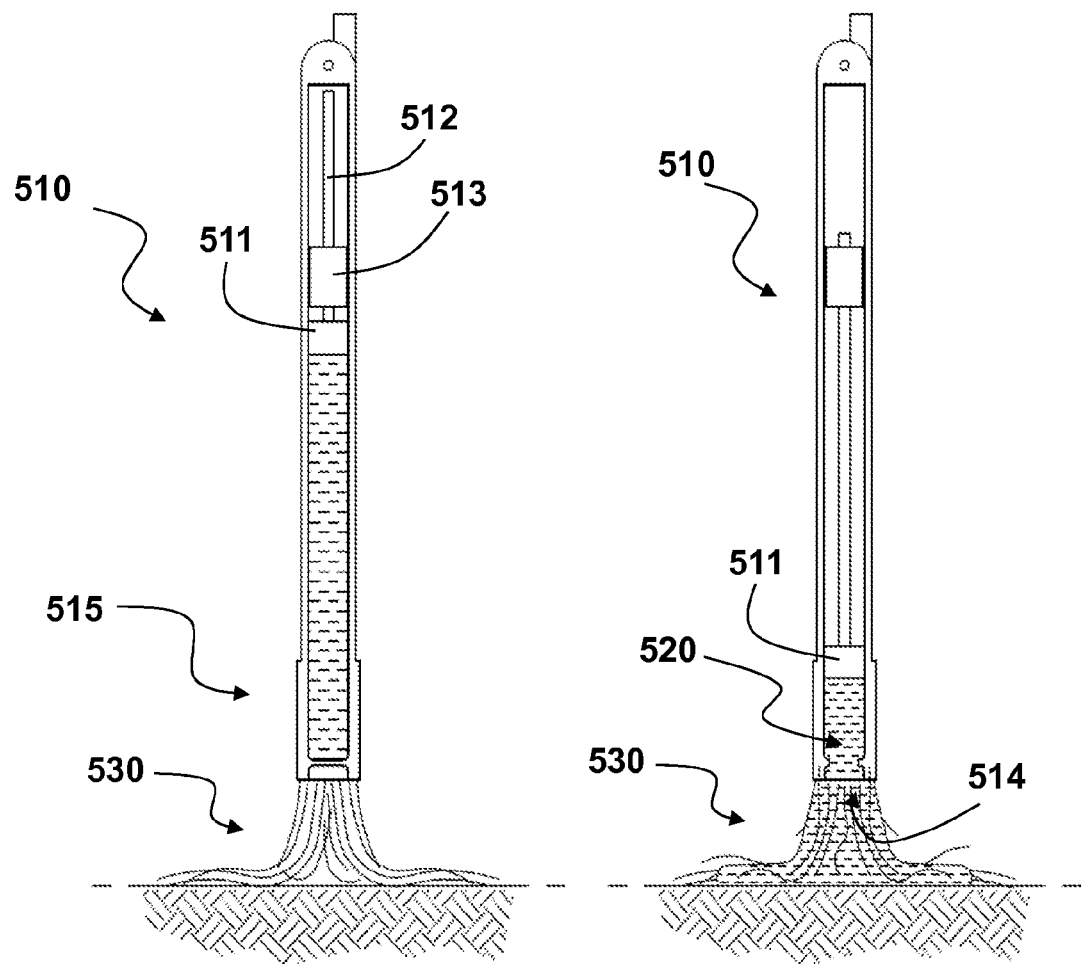
FIGS. 5A, 5B, and 5C illustrate an assembly embodiment of the present invention.
Figure 5C:
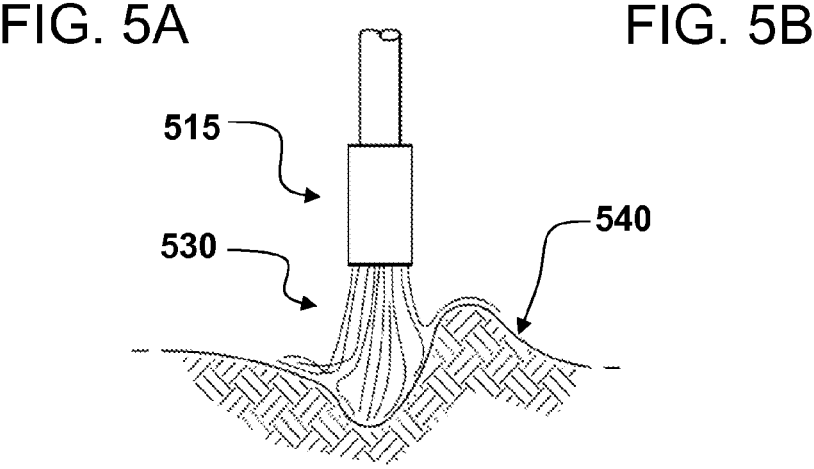
Figure 7A:
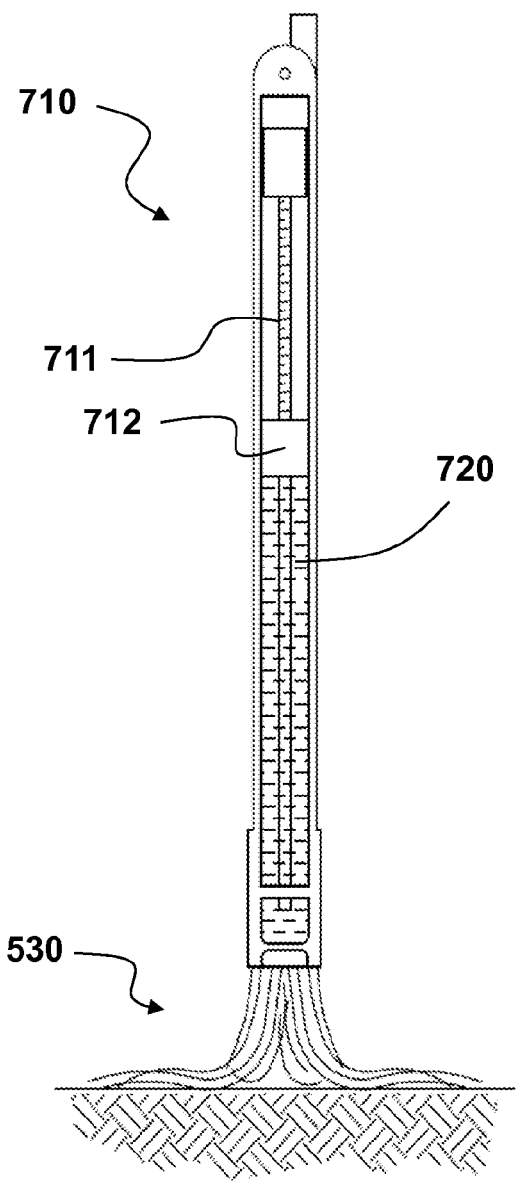
FIGS. 7A and 7B illustrate yet another assembly embodiment of the present invention.
Figure 7B:
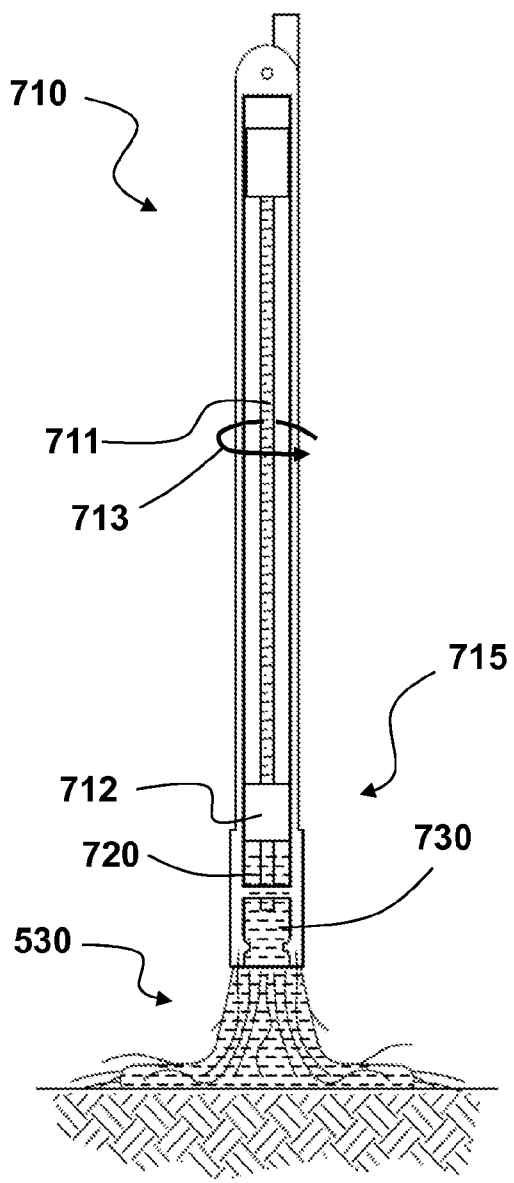
Figure 8A:
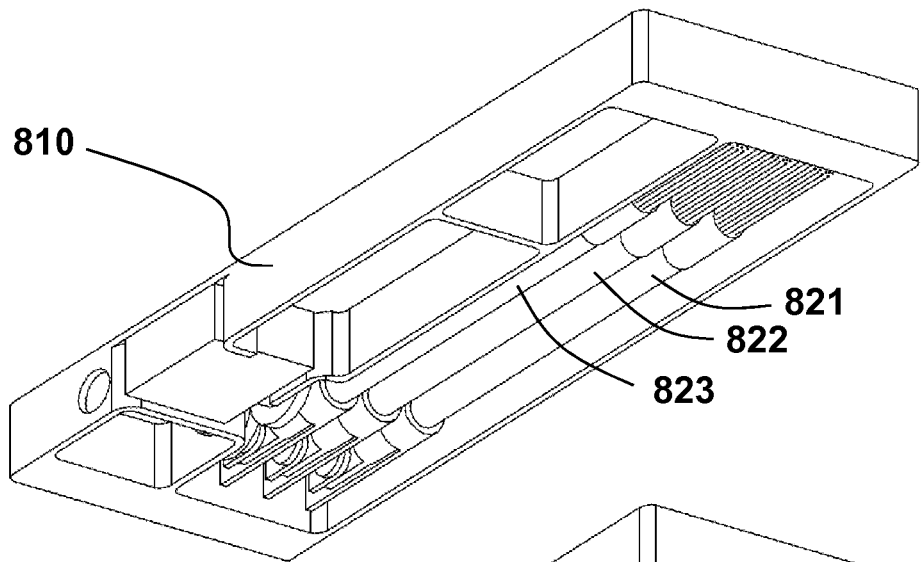
FIGS. 8A, 8B, 8C, 8D and 8E illustrate stowing and rotational deployment of an embodiment of the present invention.
Figure 8B:
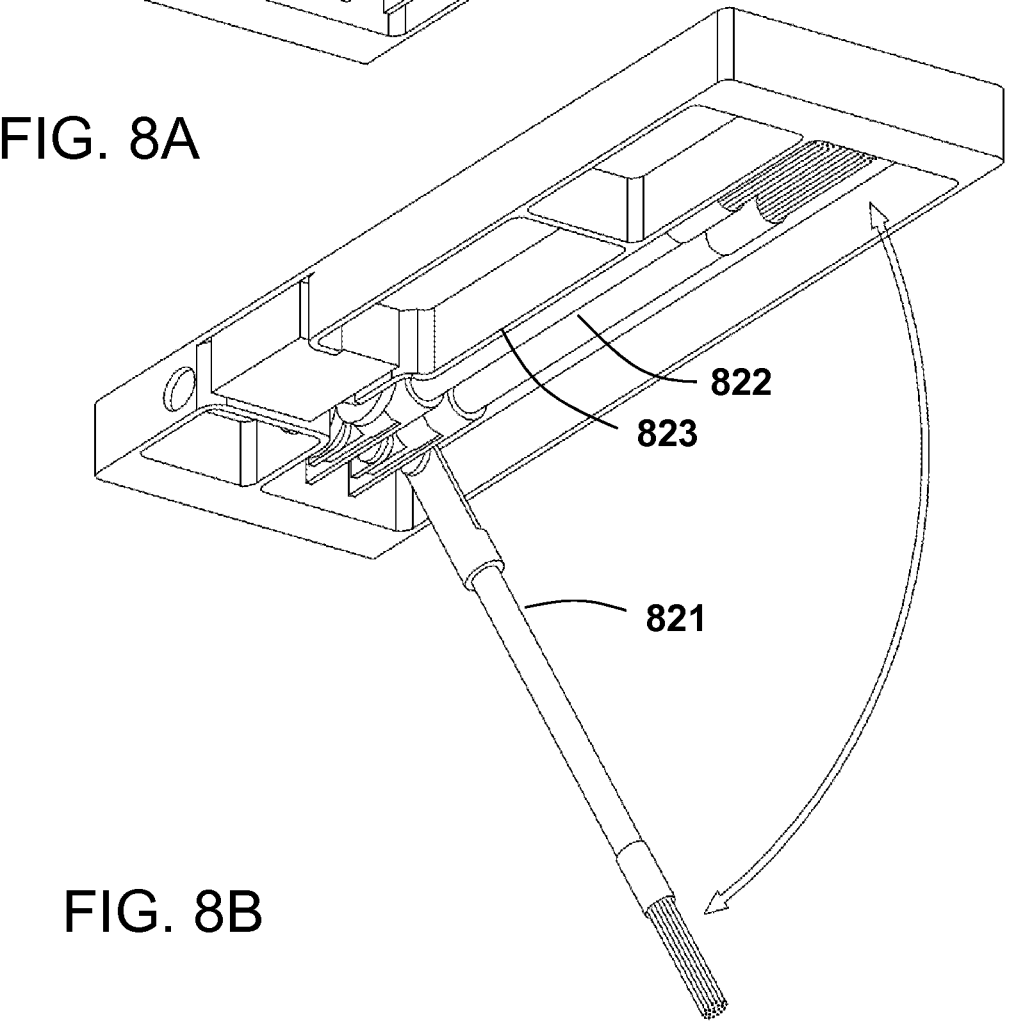
Figure 8C:
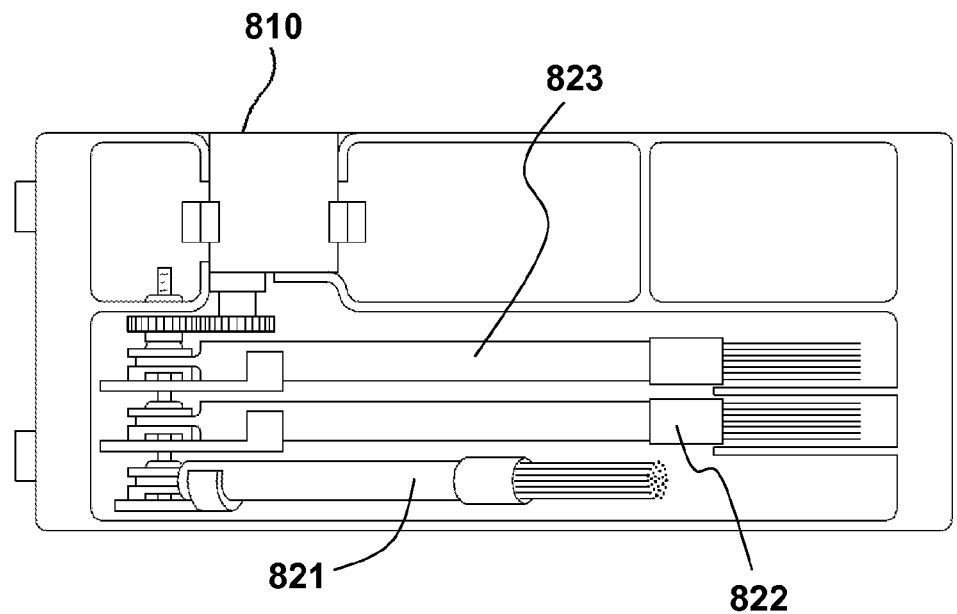
Figure 8D:
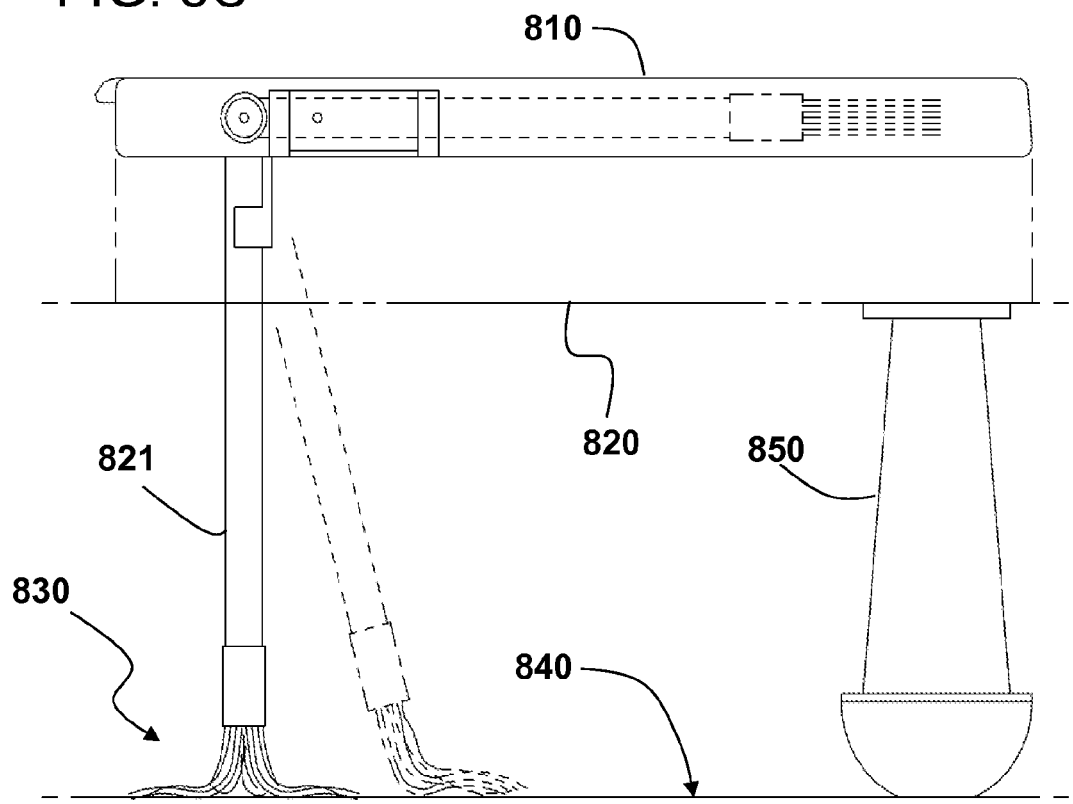
Figure 8E:
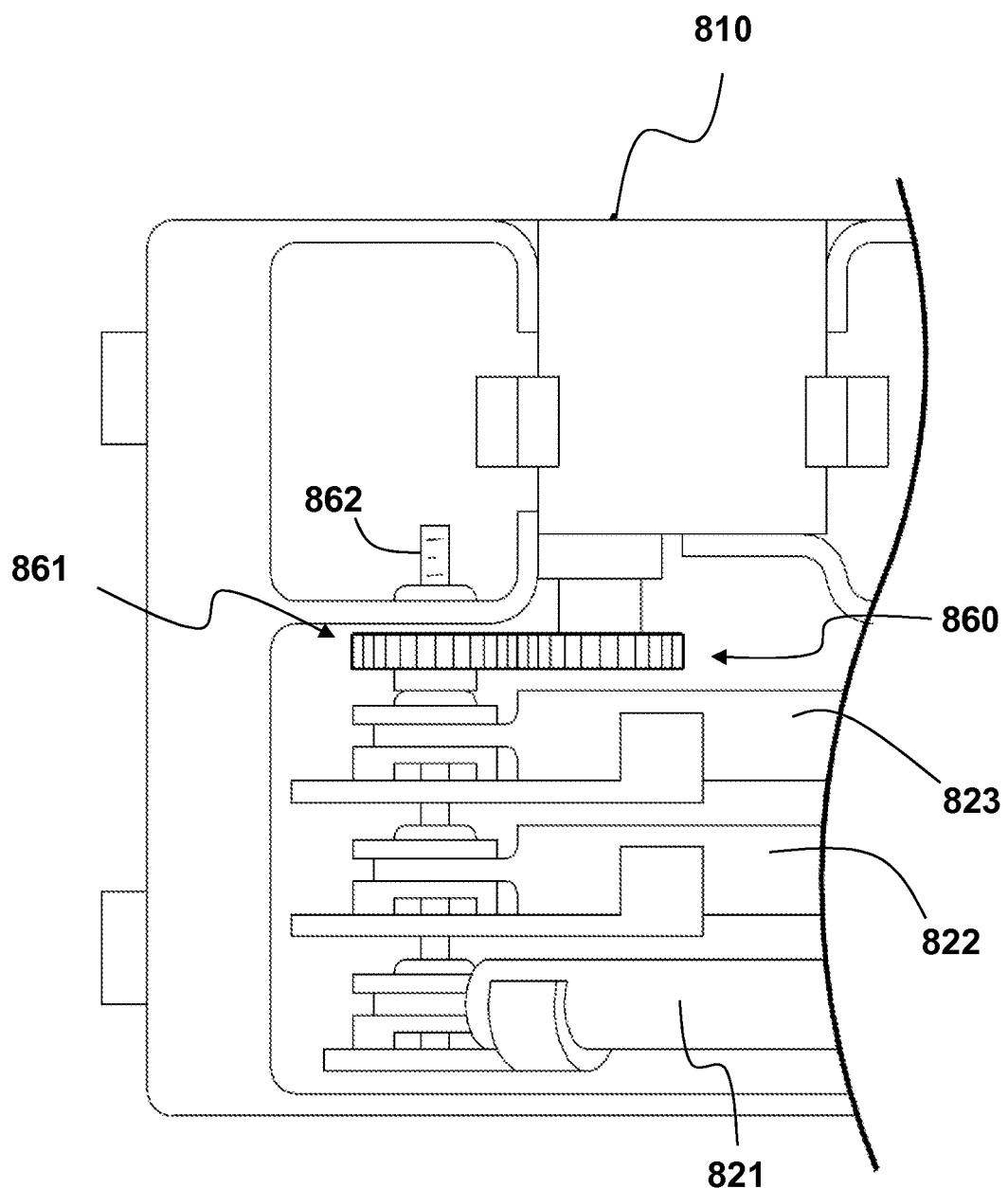
Figure 9:
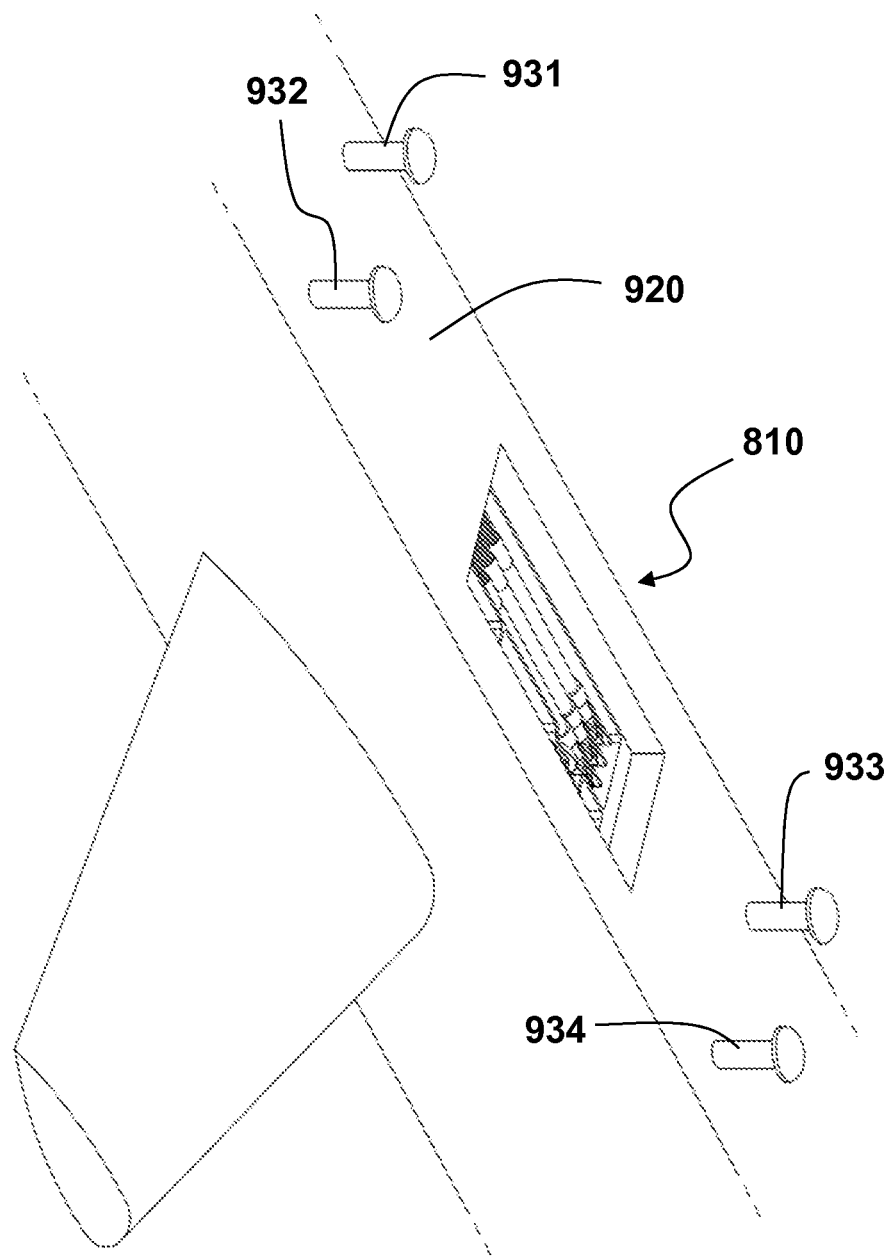
FIG. 9 illustrates an example of a dispensing case embodiment within a cavity of an aircraft fuselage.

FIG. 5A shows in cross-section the cylinder 510 having a plunger 511 with a shaft 512 piercing a stopper 513. FIG. 5B shows the liquid adhesive 520 may be expressed from the cylinder 510 as the plunger 511 moves toward the opening 514. FIG. 5C shows the brush 530 of the distal portion 515 of the cylinder 510 may disperse its fibers or filaments in such a fashion as to provide contact with uneven surfaces 540. FIG. 6A shows in cross-section the cylinder 610 having a pointed spring-loaded shaft 611 held in place by a pin 612. FIG. 6B shows that with the pin removed, the pointed spear 611 may pierce a seal 613 of the liquid adhesive reservoir, allowing the liquid glue to flow to the bundle of bristles or filaments 530. FIG. 7A shows the cylinder 710 having a threaded shaft 711 with a threaded seal/stopper 712. A liquid adhesive reservoir 720 is shown disposed between the threaded seal/stopper 712 and the brush assembly 530. FIG. 7B shows that a rotation 713 of the threaded shaft 711 causes the threaded seal 712 to translate toward the distal end 715 of the cylinder 710, thereby expressing the liquid adhesive 730 from the reservoir 720. FIG. 8A shows in perspective view a dispensing case 810 comprising three rotatably and detachably attached brush-cylinder systems 821-823. FIG. 8B shows a rotational degree of freedom of a cylinder glue dispensing embodiment 821 of the present invention. FIG. 8C shows a dispensing case 810 in a top view with a first cylinder 821 elevated. FIG. 8D shows in a side view a dispensing case 810 mounted within a body 820 with the distal brush element 830 of the cylinder 821 rotationally brought into contact with a surface 840. A leg 850 is shown attached to the body 820 providing elevational support of the body 820 from the contact surface 840. FIG. 8E shows a portion of the dispensing case assembly 810 where a drive gear assembly effects 860 the rotation of a worm gear 861 causing a threaded shaft 862 to rotate a first cylinder 821, and if the threaded shaft is further rotated, to disengage the joint of the cylinder 821—leaving the cylinder 821 mechanically disconnected from the dispensing case. Further rotation of the drive gear causes the next cylinder 822 to rotationally extend. FIG. 9 shows a dispensing case 810 disposed on the underside of an aircraft 920. Shown also in FIG. 9 are four legs 931-934 extending from the body of the aircraft.

Figure 10:
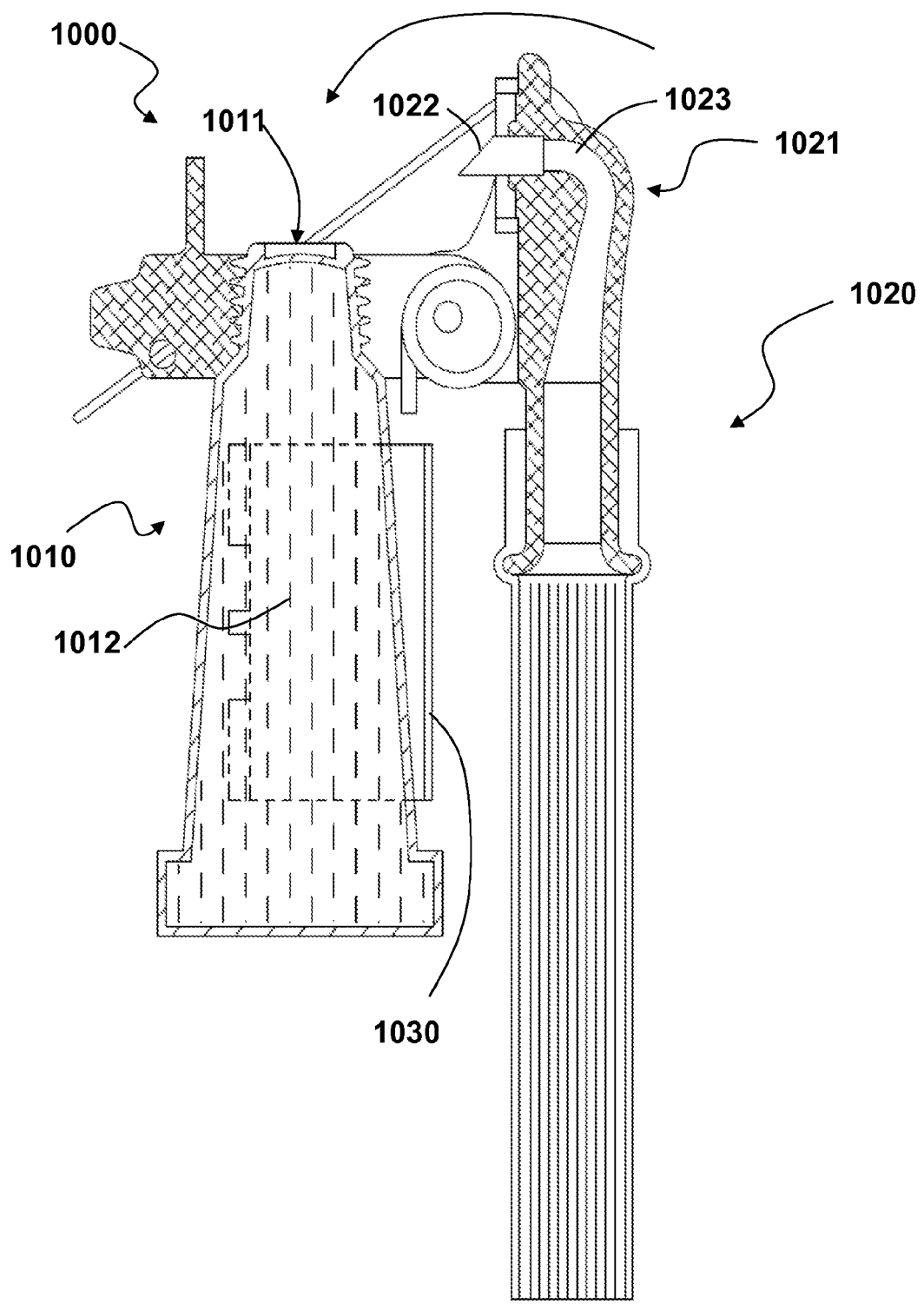
FIG. 10 illustrates another embodiment of the adhesive anchoring assembly in a stowed position.
Figure 11:
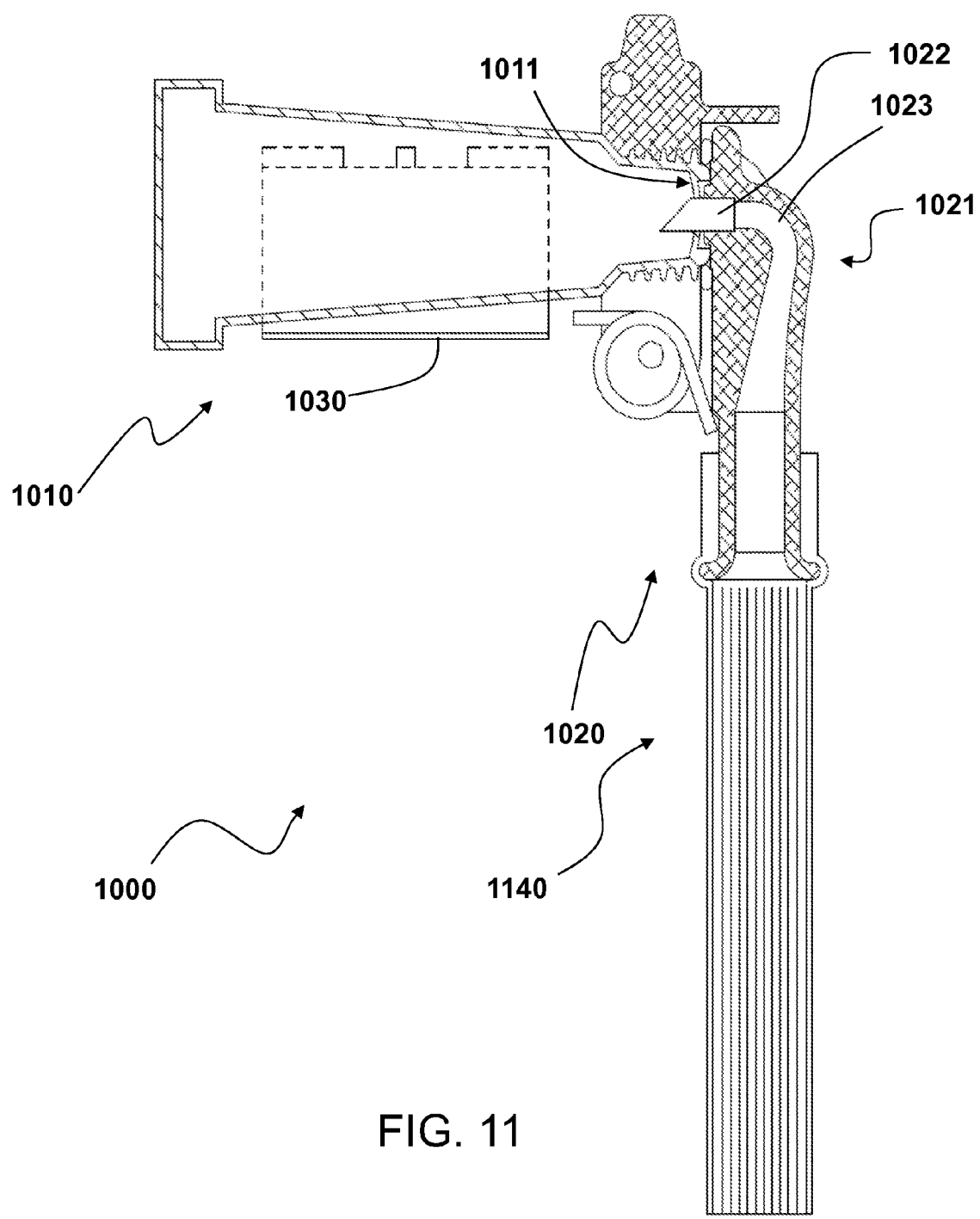
FIG. 11 illustrates another embodiment of the adhesive anchoring assembly in a deployed position.
Figure 12A:
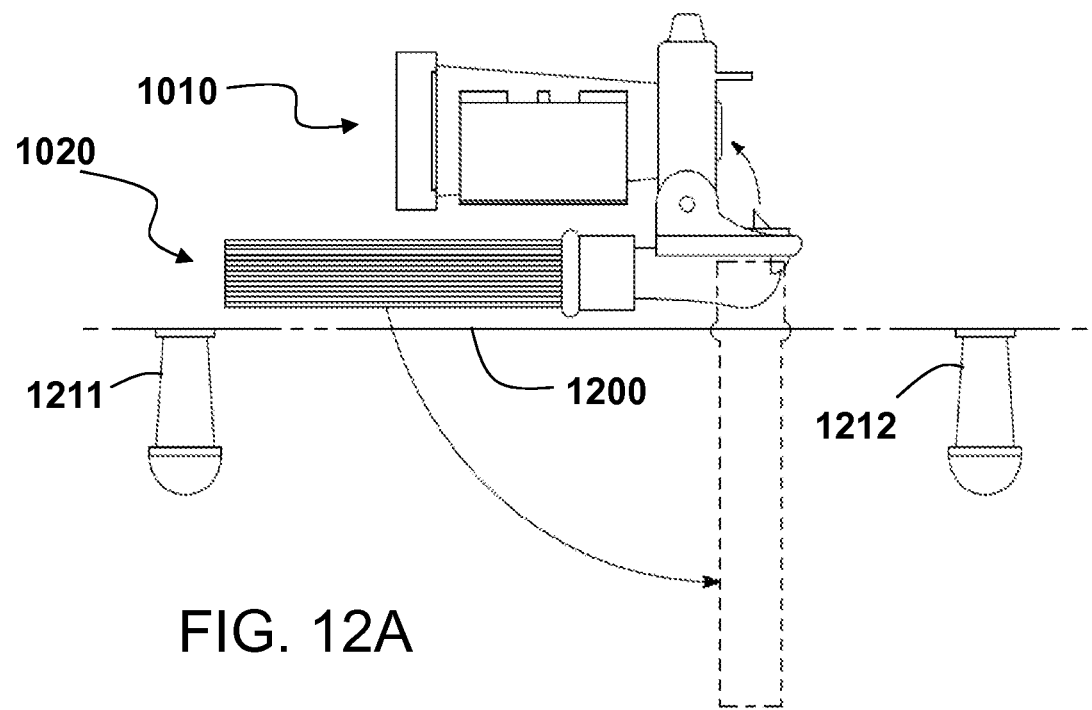
FIG. 12A illustrates another embodiment of the adhesive anchoring assembly showing a direction of rotation into a deployed position.
Figure 12B:
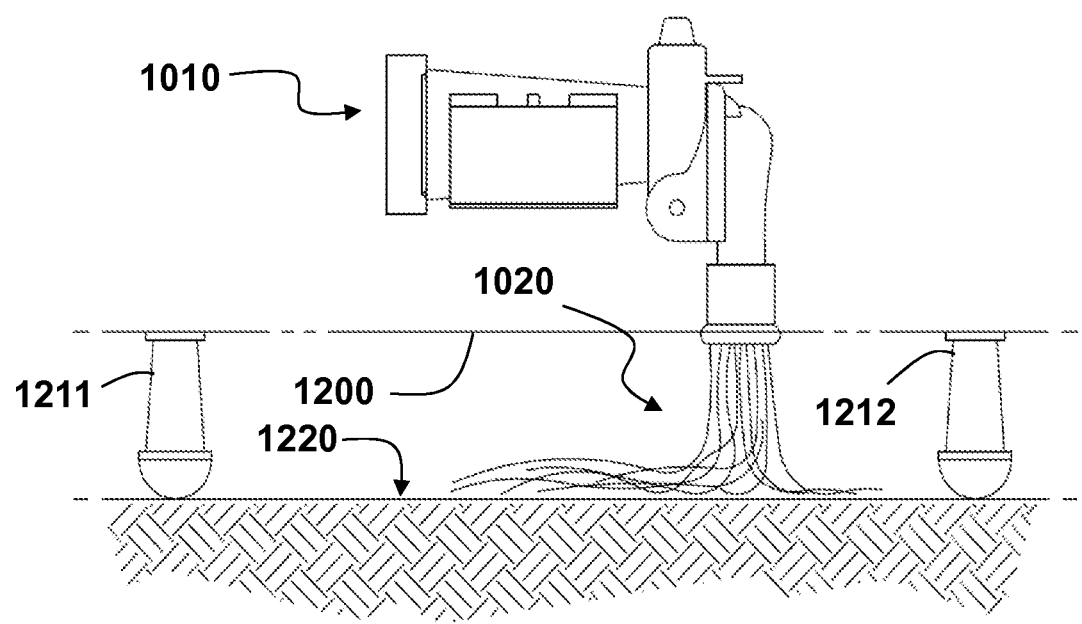
FIG. 12B illustrates the embodiment of the adhesive anchoring assembly of FIG. 12A showing a deployed position where the brush portion is in contact with a surface.
Figure 13A:
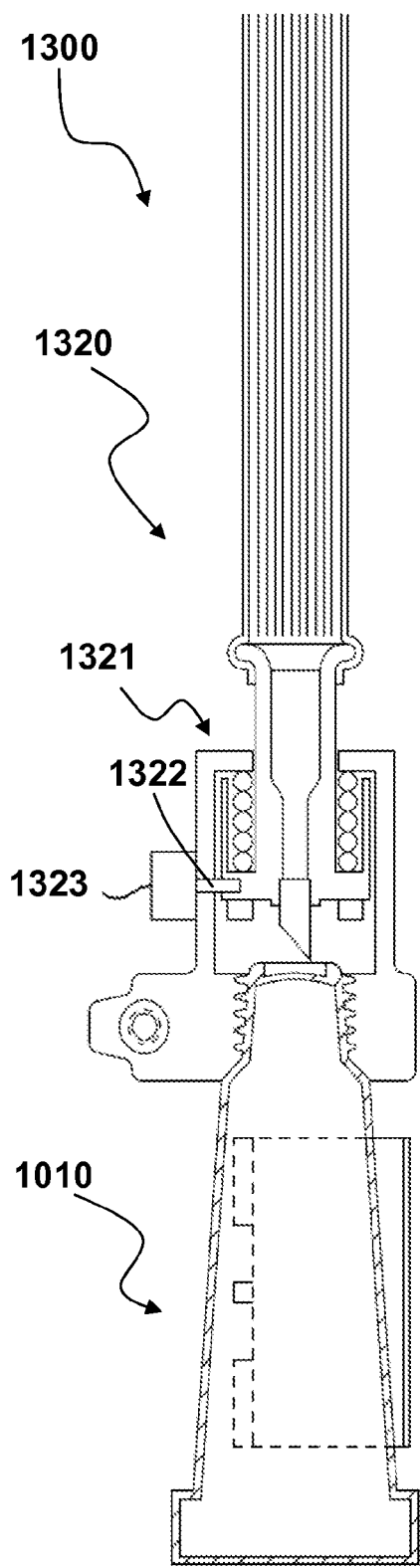
FIG. 13A illustrates another embodiment of the adhesive anchoring assembly in a stowed position.
Figure 13B:
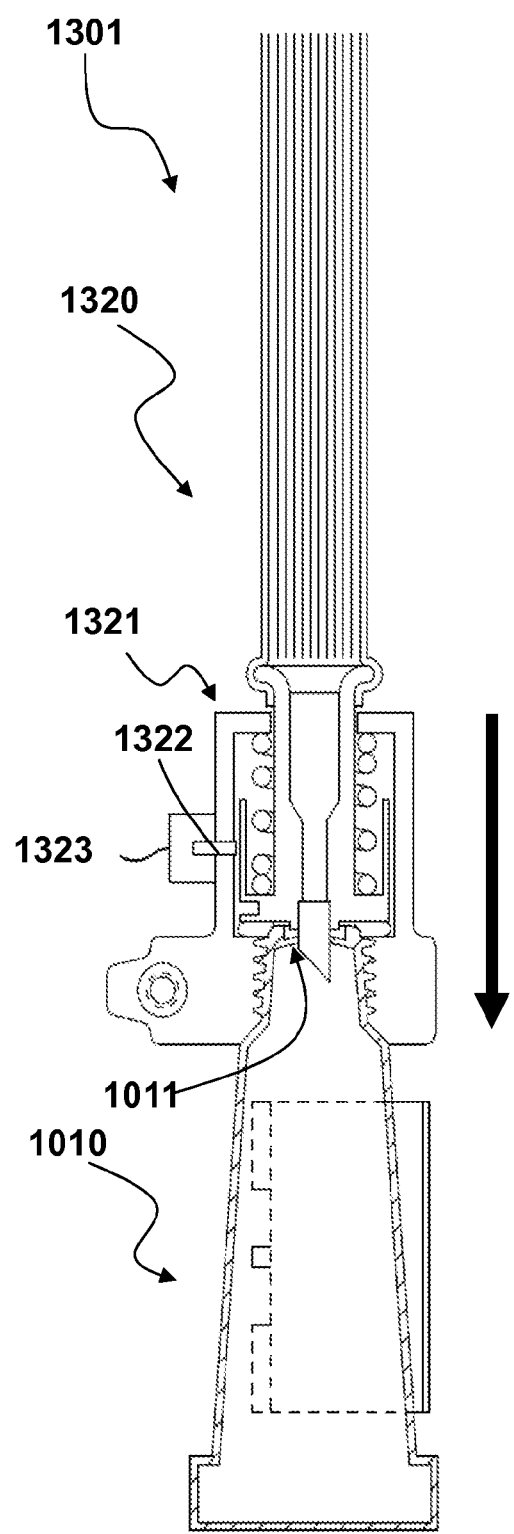
FIG. 13B illustrates the embodiment of the adhesive anchoring assembly in a stowed position of FIG. 13A with the conduit position to allow flow of a liquid adhesive to the brush portion.
Figure 13C:
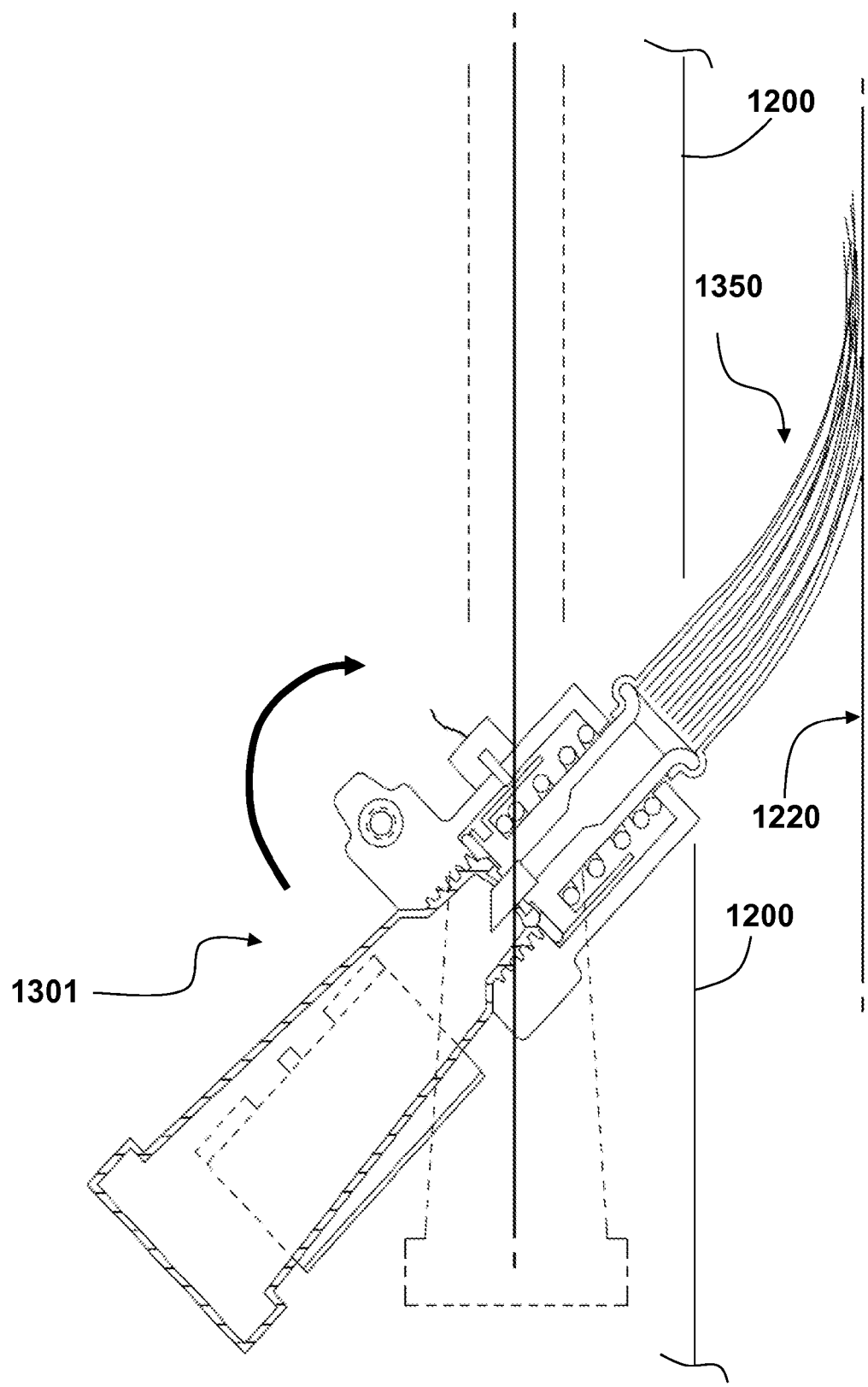
FIG. 13C illustrates the embodiment of the adhesive anchoring assembly of FIG. 13B showing a direction of rotation into a deployed position.

FIG. 10 shows an embodiment of the liquid adhesive storage and deployment assembly 1000 where the liquid adhesive reservoir 1010 and the conduit and brush assembly portion 1020 are stowed parallel to one another. The conduit 1021 has a piercing aperture 1022 disposed on a gooseneck conduit 1023. The conduit and brush assembly portion 1020 may be rotated, e.g., by a released spring-loaded rotating joint assembly, into and piercing a seal 1011 of a liquid adhesive reservoir 1010. The contents 1012 of the reservoir 1010, or glue packet may be under pressure via a clamp spring 1030. The contents 1012 of the reservoir 1010 may be under pressure, e.g., via a clamp via a gas bladder, where such embodiments may be applicable in environments with nominal atmospheric pressure variation. FIG. 11 shows the conduit and brush assembly 1020 having rotated approximately 90 degrees causing the piercing aperture 1022 to pierce the seal 1011 of the liquid adhesive reservoir 1010 and set up a path for the adhesive to flow to the bristles or filaments of the brush 1140. FIG. 12A shows the liquid adhesive reservoir 1010 and the conduit and brush assembly portion 1020 are stowed parallel to one another within a portion of an aircraft fuselage 1200 having fixed pedestal legs 1211, 1212, and that the conduit and brush assembly portion 1020 may rotate to a position orthogonal and extending from the fuselage 1200. The conduit and brush assembly portion 1020 may rotate before or after the aircraft lands on a contact surface. FIG. 12B shows an example of the brushes of the assembly in contact with the contact surface 1220. FIG. 13A shows another embodiment of the liquid adhesive storage and deployment assembly 1300 having a spring-loaded conduit and brush assembly portion 1320 having a loaded spring 1321 that may be held in place by a pin 1322 and solenoid or servo actuated 1323. The brush assembly may be further bundled via a brush filament conduit such as a silicone conduit having a distal end, for example, a brush tip. For some embodiments, the brush filament conduit may be comprised of a wrapped KEVLAR tube. FIG. 13B shows that with the pin 1322 retracted, the conduit and brush assembly 1320 has been thrust into and has penetrated the liquid adhesive reservoir seal 1011. FIG. 13C shows the liquid adhesive reservoir and the conduit and brush assembly portion of the embodiment 1301 of FIG. 13B rotated to extend the brush portion 1350 out of the fuselage 1200 and onto a contact surface 1220. Rather than pivoting about a point of rotation, the assembly may be configured so that a portion of the assembly rotates or bends to deploy the brush assembly.

Figures 15, 16:
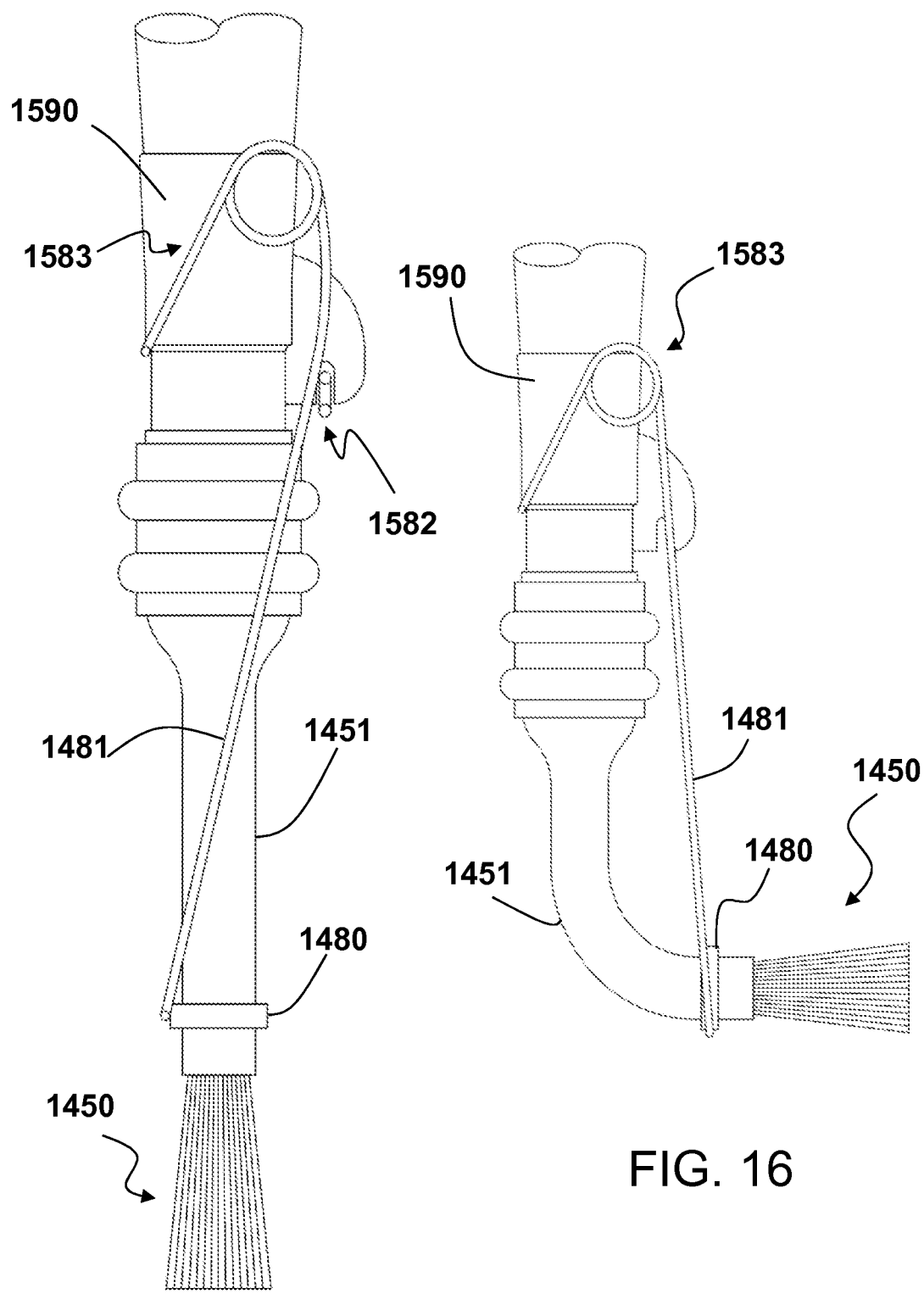
FIG. 15 illustrates a side view of the embodiment of the present invention of FIG. 14A.
FIG. 16 illustrates a side view of a deflected embodiment of the present invention depicted in FIG. 15.
Figure 17:
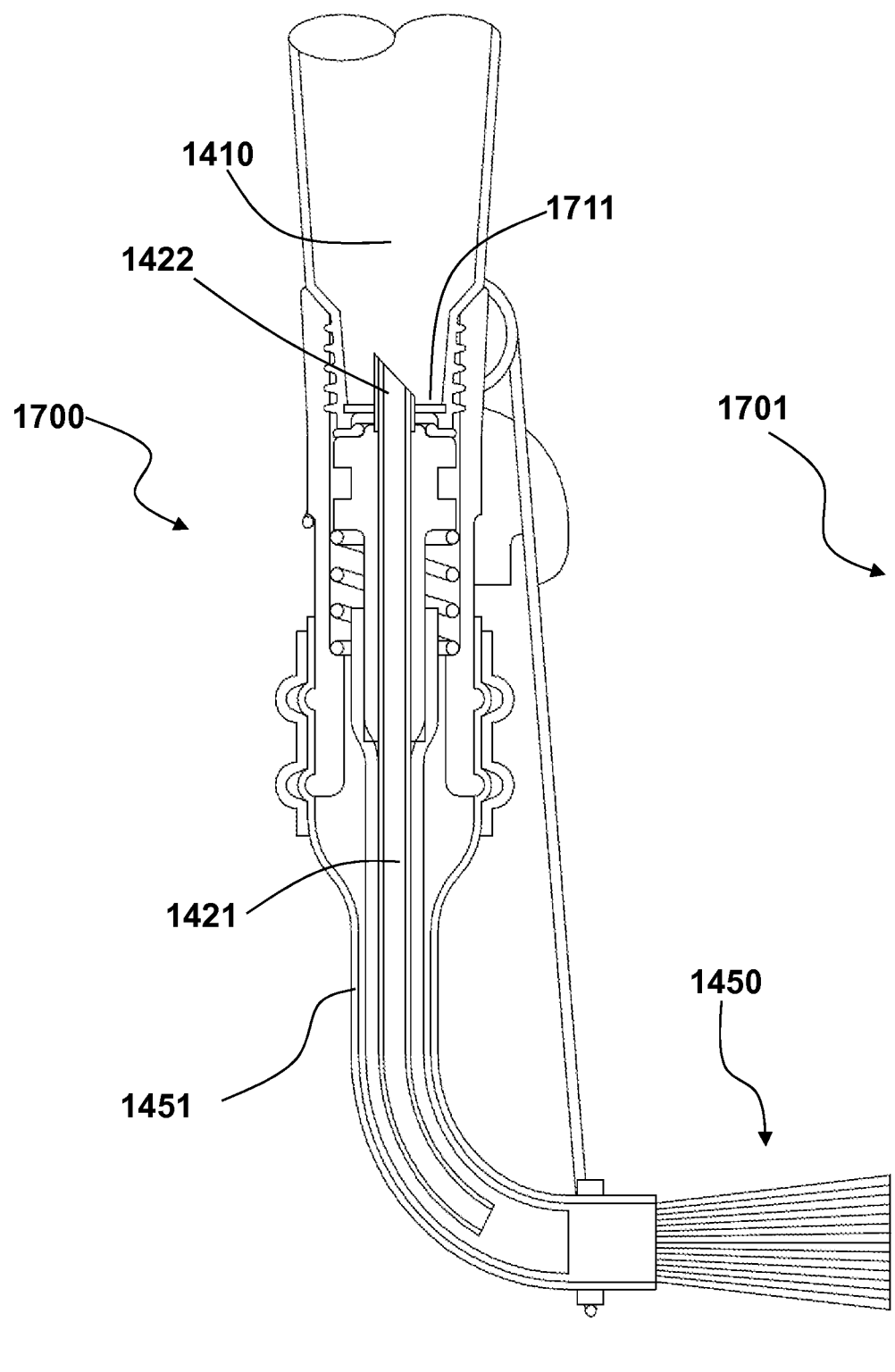
FIG. 17 illustrates a cross-sectional view of the deflected embodiment of the present invention depicted in FIG. 16.
Figure 18:
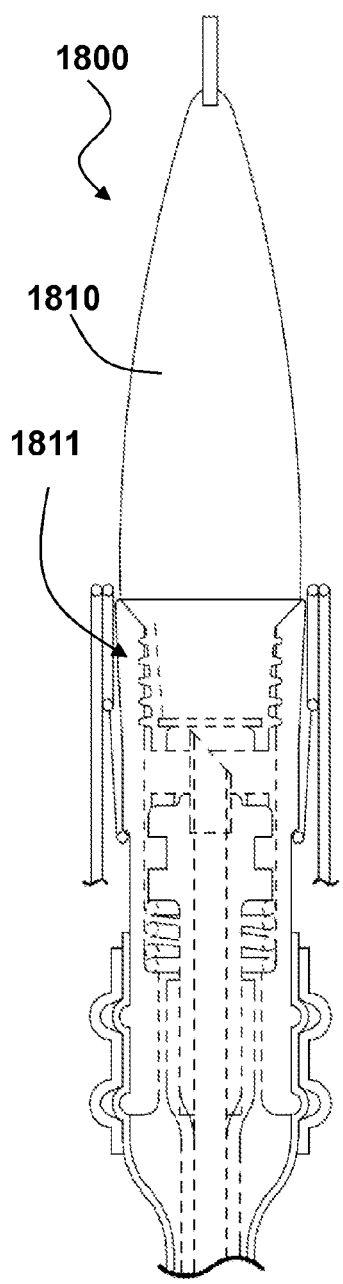
FIG. 18 illustrates in a cross-sectional view another embodiment of the present invention.
Figure 19A:
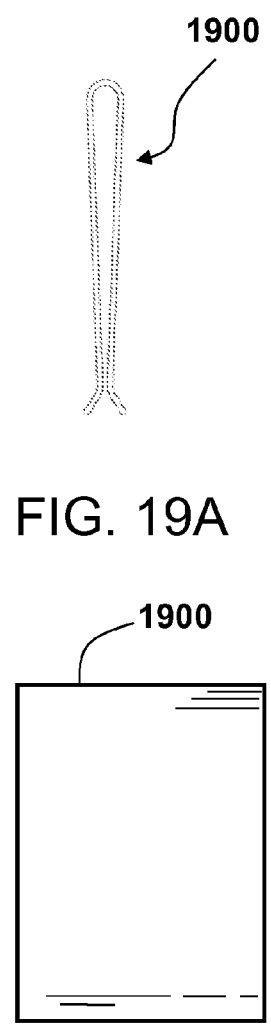
FIGS. 19A and 19B illustrate an exemplary clasp.
Figure 19B:
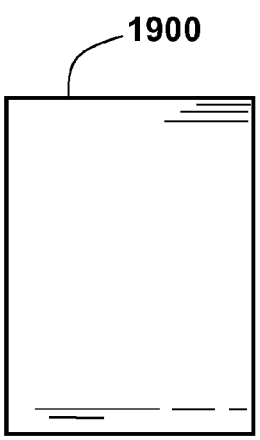
Figure 20:
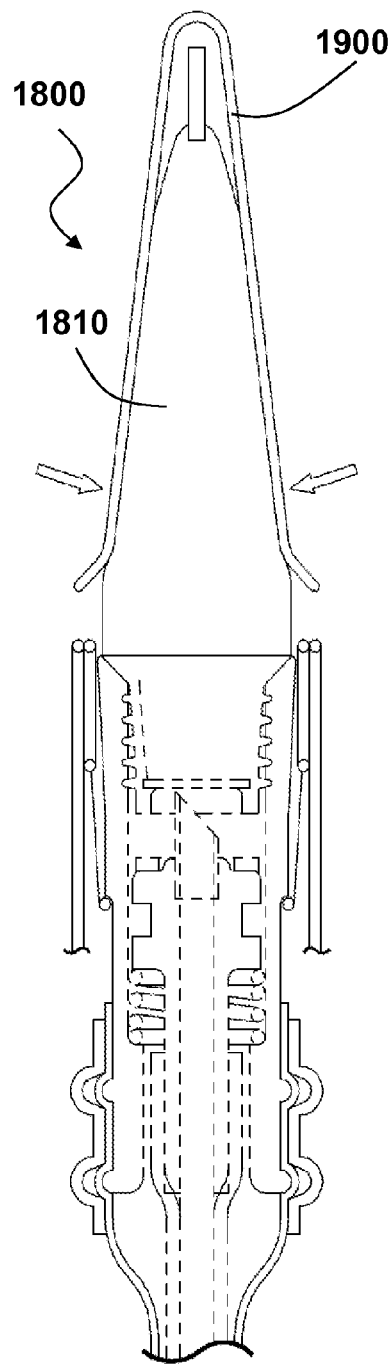
FIG. 20 illustrates in cross-sectional view the embodiment depicted in FIG. 18 further comprising a clasp.

FIG. 14A shows in a cross-sectional view another embodiment of the liquid adhesive storage and deployment assembly 1400 where a flexible lineal conduit 1421 has a piercing aperture 1422 proximate to the liquid adhesive reservoir 1410. A collar member 1480 is shown external to a brush filament conduit 1451. The brush filament bundle 1450 is shown extending from the end of the brush filament conduit 1451 distal from the liquid adhesive reservoir 1410. FIG. 14B shows in a cross-sectional view the distal portion of the assembly of FIG. 14A where the flexible lineal conduit 1421 terminates before the end of the brush filament conduit 1451 and where a portion of a spring wire 1481, as an example of a resilient member, is in contact with, or fixed to, the collar 1480. FIG. 15 shows in a side view the spring wire 1481 in contact with the collar 1480, where the collar is disposed about the brush filament conduit 1451. Another portion of the spring 1583 is disposed on a mounting sleeve or mounting case 1590 as seen in FIG. 15. The spring wire 1481 is compressed and held in place by a pin 1582. FIG. 16 shows in a side view the spring wire 1481 is in a restored, i.e., uncompressed, position and the brush filament conduit 1451 is deflected thereby reorienting the brush filament bundle 1450. FIG. 17 illustrates in a cross-sectional view the deflection of the brush filament conduit 1451 which places pressure in the distal end portion of the flexible lineal conduit 1421, a pressure that works to drive the piercing aperture 1422 into the liquid adhesive reservoir 1410 via a pierced seal 1711. Accordingly, the assembly 1700 is shown in a deployed state having a brush filament bundle 1450 receiving liquid from the reservoir 1410 and positioned for application to an exemplary surface 1701. FIG. 18 illustrates in a cross-sectional view a portion of an exemplary assembly 1800 where an adhesive reservoir 1810 may comprise a threaded portion 1811 for secure assembly. FIG. 19A illustrates in a front view a reservoir spring clasp 1900. FIG. 19B illustrates in a side view a reservoir spring clasp 1900. FIG. 20 illustrates in a cross-sectional view a portion of an exemplary assembly 1800 where an adhesive reservoir 1810 may have a reservoir spring clasp 1900 apply pressure to the reservoir 1810.

FIG. 21 illustrates in a perspective view an exemplary frusto-conical tip 2100 of an embodiment of the present invention that may be disposed on an end of an adhesive flow conduit 1421. The exemplary frusto-conical tip 2100 is depicted as including a cylindrical attachment band portion 2110. The exemplary frusto-conical tip 2100 may be embodied having opposing teardrop-shaped apertures where a first teardrop-shaped aperture 2120 is shown in FIG. 21 depicted having opposing teardrop-shaped apertures, the narrow portions of the teardrop distal from the conduit, the wider portions of the teardrop proximate to the cylindrical band, and where the teardrop-shaped apertures are shown disposed on the conic portion of the tip. FIG. 22 illustrates in an elevational side view an exemplary frusto-conical tip 2100 of an embodiment of the present invention having a teardrop-shaped aperture 2120. FIG. 23 illustrates in a top view an exemplary frusto-conical tip 2100 of an embodiment of the present invention and depicts the first teardrop-shaped aperture 2120 opposing a second teardrop-shaped aperture 2121. FIG. 24 illustrates in an elevational front view an exemplary frusto-conical tip 2100 of an embodiment of the present invention.

Figure 25:
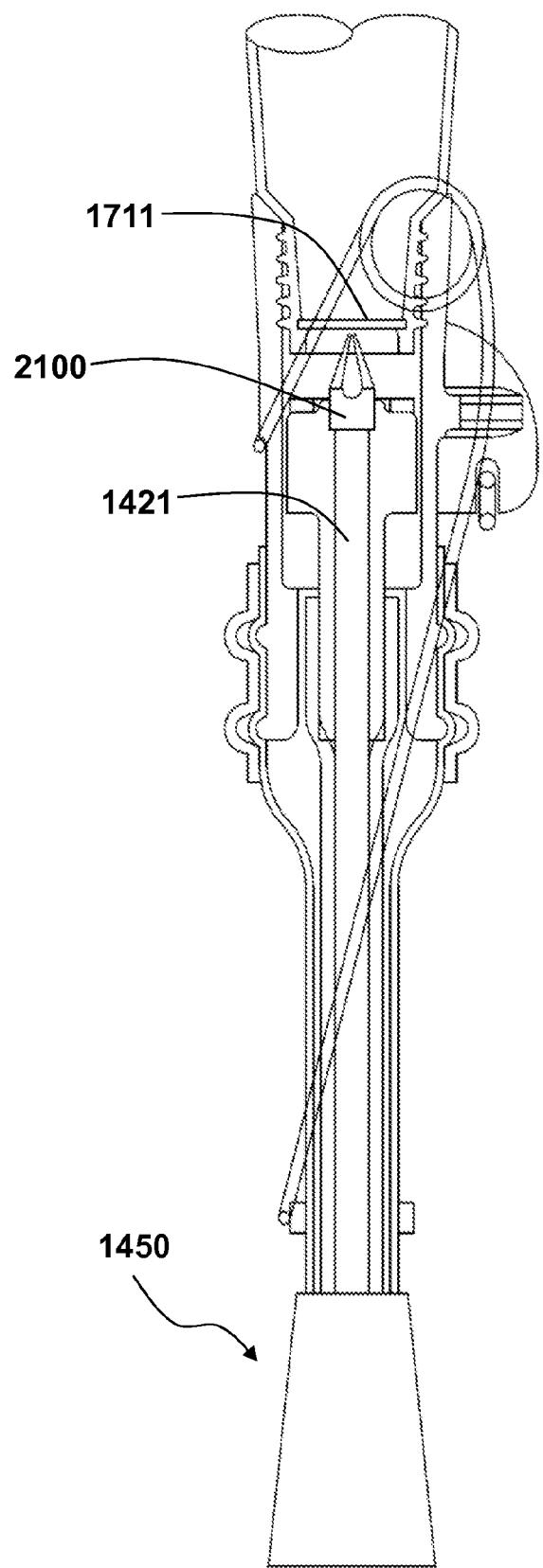
FIG. 25 illustrates in a cross-sectional view another embodiment of the present invention.
Figure 26:
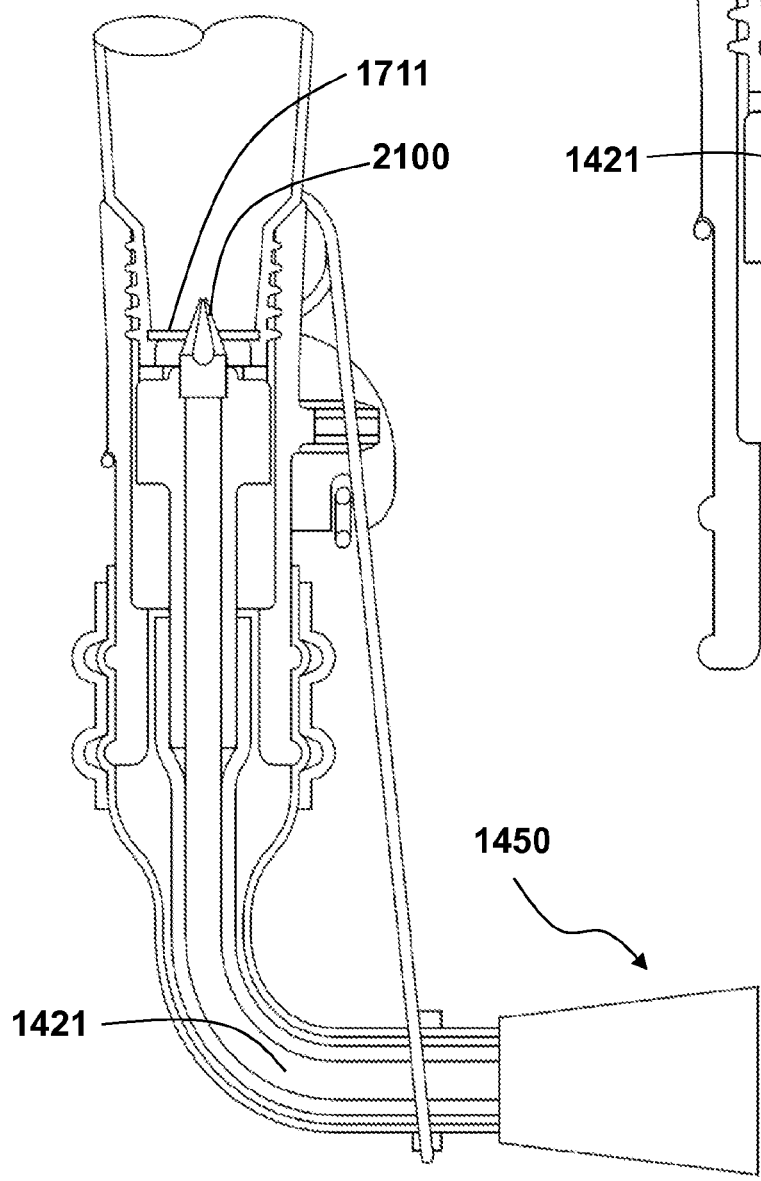
FIG. 26 illustrates a cross-sectional view of the deflected embodiment of the present invention depicted in FIG. 25.

FIG. 25 illustrates in a cross-sectional view another embodiment of the present invention comprising an adhesive flow conduit 1421 having a frusto-conical tip 2100 proximate to the adhesive reservoir seal 1711. FIG. 26 illustrates a cross-sectional view of the deflected embodiment of the present invention depicted in FIG. 25 where the frusto-conical tip 2100 is shown piercing the adhesive reservoir seal 1711.

Figure 27:
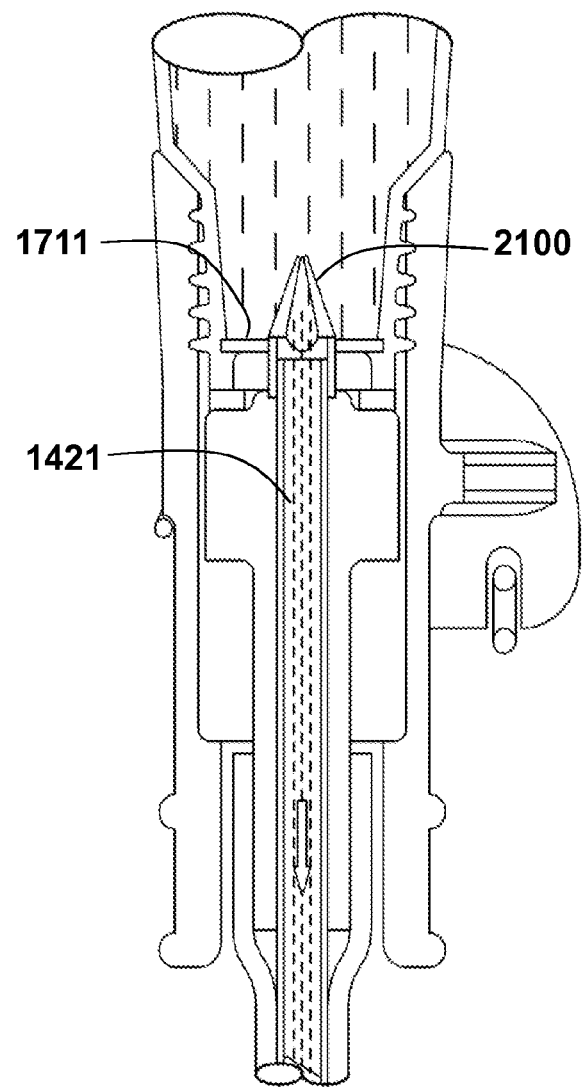
FIG. 27 illustrates a cross-sectional view of a portion of a deflected embodiment of the present invention depicted in FIG. 25.
Figure 28:
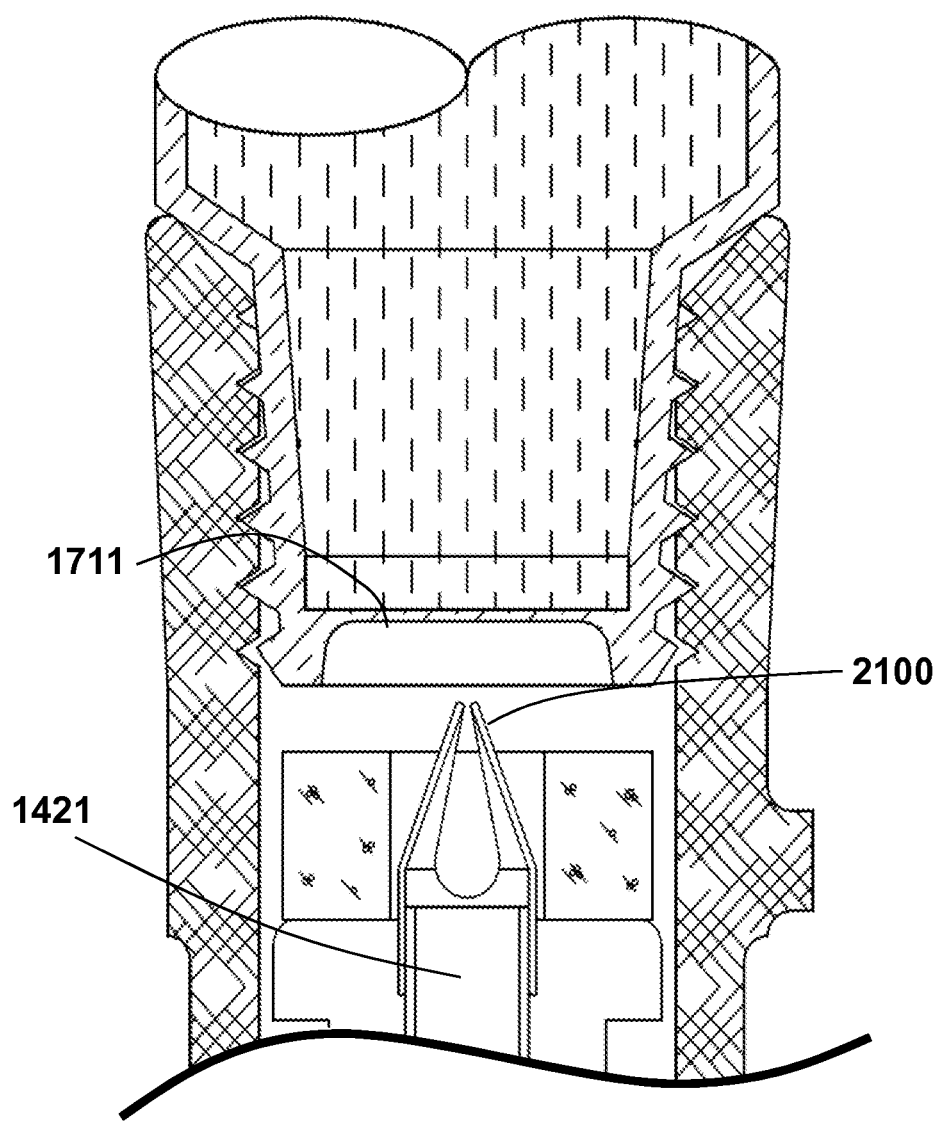
FIG. 28 illustrates a cross-sectional view of a portion of the embodiment of the present invention depicted in FIG. 25.
Figure 29:
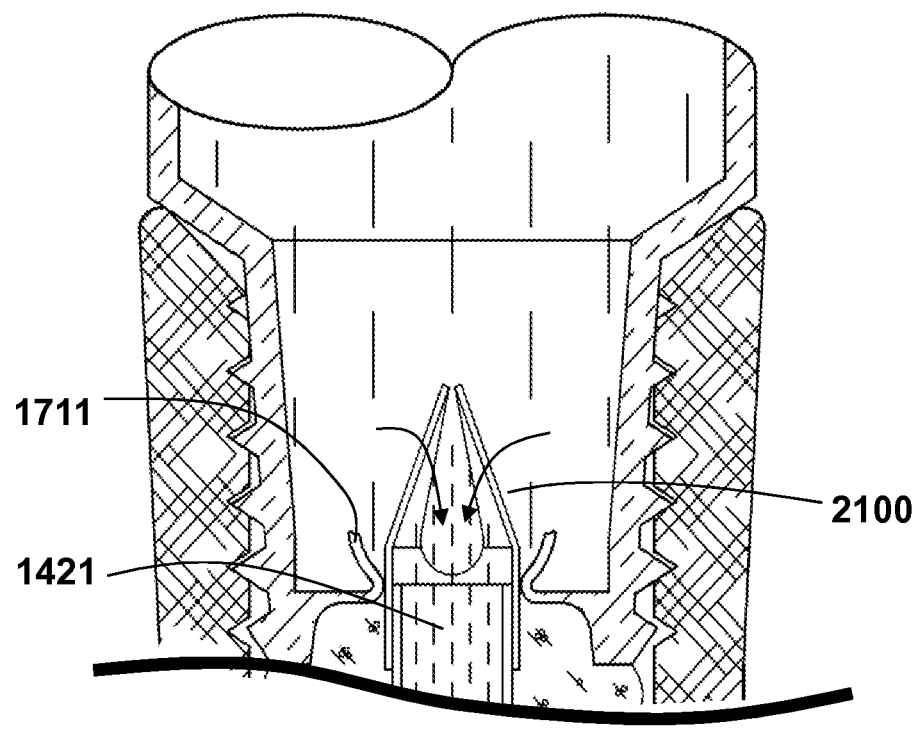
FIG. 29 illustrates a cross-sectional view of a portion of a deflected embodiment of the present invention depicted in FIG. 25.

FIG. 27 illustrates a cross-sectional view of a portion of a deflected embodiment of the present invention depicted in FIG. 25 where the frusto-conical tip 2100 has pierced the adhesive reservoir seal 1711 and where the adhesive of the reservoir flows into the conduit 1421 via the teardrop-shaped apertures 2120, 2121 of the frusto-conical tip 2100. Expanded depictions are shown in FIGS. 28 and 29 where in FIG. 28 is illustrated a cross-sectional view of a portion of the embodiment of the present invention depicted in FIG. 25, and where in FIG. 29 is illustrated a cross-sectional view of a portion of a deflected embodiment of the present invention depicted in FIG. 25.

Accordingly, embodiments of the present invention may provide a system for use in temporarily affixing an aircraft to the ground and in which the aircraft has a removable gripper, or anchor unit attached to the undercarriage. The anchor or gripper unit has a frame containing three ground-lock tubes. Each tube connects to an actuation system configured to extend the tube down such that a brush portion at the end of the tube is pressed against the tube, splaying the brush filaments on the ground. Embodiments of the invention include an adhesive reservoir that may be a tube having an inner piston configured to eject an adhesive such as, for example, a tenacious adhesive type substance, which is stored within the tube, out of the tube and through the brush portion. For example, cyanoacrylate is the generic name for cyanoacrylate-based, fast-acting glues such as methyl-2-cyanoacrylate, ethyl-2-cyanoacrylate (commonly sold under trade names like The Original Super Glue® and Krazy Glue), n-butyl-cyanoacrylate (used in the veterinary glues Vetbond and LiquiVet and skin glues like Indermil and Histoacryl). 2-octyl cyanoacrylate is the medical grade glue encountered under various trade names, e.g. SurgiSeal™, FloraSeal™, Dermabond™, and Nexaband™. The liquid adhesive such as a cyanoacrylate adhesive binds the plane to the ground once the adhesive dries. To provide the aircraft with stability during windy conditions, the ground point to which the brush attaches may be located directly below the aircraft center of drag, or proximate to that location. The tube actuation system may be configured to release the tube when it is time for the aircraft to be released from the ground.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising:
   an air vehicle configured to adhere with an adhesive to an external surface;
   an adhesive anchoring assembly of the air vehicle configured to adhere, via the adhesive, to an air vehicle landing surface external to the air vehicle; and
   at least one cylinder of the adhesive anchoring assembly configured to rotate relative to the air vehicle, the at least one cylinder comprising an attachment joint disposed on one end of the at least one cylinder proximate to the air vehicle and a brush assembly disposed on a distal end of the at least one cylinder.

2. The system of claim 1 further comprising:
   a contact member of the adhesive anchoring assembly configured to adhere to the air vehicle landing surface, wherein the contact member is connected to the air vehicle by an attachment member.

3. The system of claim 2 wherein the attachment member is configured to detach from the air vehicle.

4. The system of claim 2 wherein the contact member is configured to detach from the attachment member, wherein the attachment member remains connected to the air vehicle.

5. The system of claim 1 wherein the at least one cylinder is rotated relative to the air vehicle before the air vehicle has landed on the air vehicle landing surface.

6. The system of claim 1 wherein the at least one cylinder is rotated relative to the air vehicle after the air vehicle has landed on the air vehicle landing surface.

7. The system of claim 1 wherein the brush assembly is configured to splay over the air vehicle landing surface.

8. The system of claim 7 wherein the air vehicle landing surface is substantially uneven.

9. The system of claim 1 further comprising:
   a liquid adhesive reservoir configured to conduct the adhesive to the brush assembly via a fluid conduit disposed between the liquid adhesive reservoir and the brush assembly.

10. The system of claim 9 further comprising:
    a spear disposed on an end of the fluid conduit, the spear configured to pierce a seal of the liquid adhesive reservoir.

11. The system of claim 9 wherein the adhesive is configured to infuse the brush assembly, wherein the brush assembly comprises at least one of: a filament array, a bristle array, one or more strips of fabric, one or more cotton balls, and one or more clumps of cloth.

12. The system of claim 9 further comprising:
    at least one cylinder configured to detach from the adhesive anchoring assembly at the attachment joint.

13. The system of claim 12 further comprising:
    a second cylinder of the adhesive anchoring assembly configured to rotate relative to the air vehicle, the second cylinder comprising a second attachment joint disposed on one end of the second cylinder proximate to the air vehicle and a second brush assembly disposed on a distal end of the second cylinder;
    wherein the second brush assembly is configured to splay over a second air vehicle landing surface; and
    a second adhesive is configured to conduct from a second liquid adhesive reservoir to the second brush assembly;
    wherein the second brush assembly is configured to infuse with the second adhesive, wherein the second brush assembly comprises at least one of: a filament array, a bristle array, one or more strips of fabric, one or more cotton balls, and one or more clumps of cloth.

14. The system of claim 13 wherein the second cylinder is configured to detach from the adhesive anchoring assembly at the second attachment joint.

15. The system of claim 1 further comprising:
    a resiliently loaded conduit of the adhesive anchoring assembly, the resiliently loaded conduit having a spear disposed on an end of the conduit;
    wherein the spear is configured to pierce a liquid adhesive reservoir of the adhesive anchoring assembly having positive pressure above a local atmospheric pressure;
    wherein the conduit is configured to conduct the adhesive to a brush assembly of the adhesive anchoring assembly; and
    wherein the brush assembly is configured to infuse with the adhesive.

16. The system of claim 15 further comprising:
    a portion of the adhesive anchoring assembly configured to detach from the air vehicle.

17. The system of claim 16 wherein the air vehicle is configured to adhere with a second adhesive to a second external surface.

18. A system comprising:
    an adhesive anchoring assembly of an air vehicle configured to adhere, via an adhesive, to an air vehicle landing surface external to the air vehicle.

19. The system of claim 18 further comprising:
a brush assembly of the adhesive anchoring assembly configured to splay over the landing surface external to the air vehicle;
wherein the splayed brush assembly is configured to infuse with the adhesive.

20. The system of claim 19 further comprising:
at least a portion of the adhesive anchoring assembly configured to detach from the air vehicle.

21. A system comprising:
a liquid adhesive configured to release from a liquid adhesive reservoir in an air vehicle; and
a conduit configured to conduct the released liquid adhesive from the liquid adhesive reservoir to a distal end of the conduit;
wherein the liquid adhesive is configured to adhere a distal end of the conduit to a surface external to the air vehicle.

22. The system of claim 21 further comprising:
a resiliently loaded spear configured to pierce the liquid adhesive reservoir, wherein the liquid adhesive reservoir is pressurized above a local atmospheric pressure.

23. The system of claim 22 wherein the conducted liquid adhesive is configured to infuse a brush assembly disposed on the distal end of the conduit, wherein the infused brush assembly is splayed on the surface external to the air vehicle.

24. A system comprising:
an air vehicle; and
an adhesive anchoring assembly configured to adhesively adhere to an air vehicle landing surface external to the vehicle.

25. The system of claim 24 wherein a portion of the adhesive anchoring assembly is detachable.

26. The system of claim 24 wherein a portion of the adhesive anchoring assembly is configured to rotate into a deployed position.

27. The system of claim 24 wherein the adhesive anchoring assembly comprises a liquid adhesive reservoir and a liquid adhesive infusible brush.

28. The system of claim 24, wherein the adhesive anchoring assembly comprises:
(a) an adhesive container comprising fluid adhesive; (b) one or more fibers, wherein the one or more fibers are configured to conduct the fluid adhesive and to structurally support an adhesive bond between the one or more fibers and the a surface external to the air vehicle; and (c) an attachment member disposed between the adhesive container and the air vehicle, wherein the attachment member is configured to detachably attach the adhesive container and one or more fibers from the air vehicle.

29. The system of claim 27, further comprising:
a resilient member having one end disposed proximate to the liquid adhesive reservoir and the other end disposed proximate to the liquid adhesive infusible brush; and
a fluid conduit having a piercing aperture configured to pierce a seal of the liquid adhesive reservoir proximate to a decompression of the resilient member.

30. The system of claim 29, wherein the fluid conduit further comprises a frusto-conical piercing tip.

31. The system of claim 24, wherein the adhesive anchoring assembly comprises:
(a) an adhesive container comprising fluid adhesive; (b) one or more fibers, wherein the one or more fibers are configured to conduct the fluid adhesive and to structurally support an adhesive bond between the one or more fibers and the surface external to the air vehicle; and (c) an attachment member disposed between the adhesive container and the one or more fibers, wherein the attachment member is configured to detachably attach the adhesive container from the one or more fibers.

* * * * *